US010479482B1

(12) United States Patent
Kuentzel et al.

(10) Patent No.: US 10,479,482 B1
(45) Date of Patent: Nov. 19, 2019

(54) PROPELLER WITH PASSIVE VARIABLE PITCH AND ROTATABLE BASE

(71) Applicant: Kitty Hawk Corporation, Mountain View, CA (US)

(72) Inventors: Steffen Kuentzel, San Francisco, CA (US); Damon Vander Lind, East Palo Alto, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 0 days.

(21) Appl. No.: 16/213,636

(22) Filed: Dec. 7, 2018

(51) Int. Cl.
| | | |
|---|---|---|
| *B64C 11/32* | (2006.01) | |
| *B64C 11/20* | (2006.01) | |
| *B64C 27/39* | (2006.01) | |
| *B64C 27/473* | (2006.01) | |
| *F04D 29/32* | (2006.01) | |
| *F04D 29/36* | (2006.01) | |

(52) U.S. Cl.
CPC ............. *B64C 11/32* (2013.01); *B64C 11/20* (2013.01); *B64C 27/39* (2013.01); *B64C 27/473* (2013.01); *F04D 29/323* (2013.01); *F04D 29/364* (2013.01)

(58) Field of Classification Search
CPC ......... B64C 11/06; B64C 11/20; B64C 11/32; B64C 27/39; B64C 27/473; F04D 29/323; F04D 29/364
See application file for complete search history.

(56) References Cited

U.S. PATENT DOCUMENTS

| | | | | |
|---|---|---|---|---|
| 3,926,391 A | | 12/1975 | Nordine | |
| 5,249,925 A | * | 10/1993 | Guimbal | ................. B64C 11/32 416/134 A |
| 7,147,182 B1 | | 12/2006 | Flanigan | |
| 8,439,640 B2 | * | 5/2013 | Arel | ........................ B64C 11/38 416/117 |
| 2006/0280608 A1 | * | 12/2006 | McCallum | .............. F04D 29/36 416/112 |

OTHER PUBLICATIONS

Author Unknown, Chapter 12 Transition of Multiengine Airplanes, 12Charlie.com, Aug. 28, 2018, pp. 1-5, http://www.12charlie.com/Chapter_12/Chap12Page005.htm.
Author Unknown, Constant-speed propeller, Wikipedia, Aug. 28, 2018, pp. 1-2, https://en.wikipedia.org/wiki/Constant-speed_propeller.
Colin Cutler, How a Constant Speed Propeller Works, Boldmethod, Dec. 19, 2017, pp. 1-16, http://www.boldmethod.com/learn-to-fly/aircraft-systems/how-a-constant-speed-prop-works/.

\* cited by examiner

*Primary Examiner* — Ninh H. Nguyen
(74) *Attorney, Agent, or Firm* — Van Pelt, Yi & James LLP

(57) ABSTRACT

In an embodiment, a propeller assembly includes a blade and a joint. The blade is adapted to rotate about a longitudinal axis of the blade to vary a pitch of the blade, wherein the blade includes a plurality of bearings provided on a proximal end of the blade. The joint is adapted to couple the blade to a central shaft of the assembly via the plurality of bearings, where the joint is adapted to telescope and twist along the central shaft of the assembly such that in a first position, the blade is at a first angle. In a second position, the blade is at a second angle greater than the first angle.

21 Claims, 15 Drawing Sheets

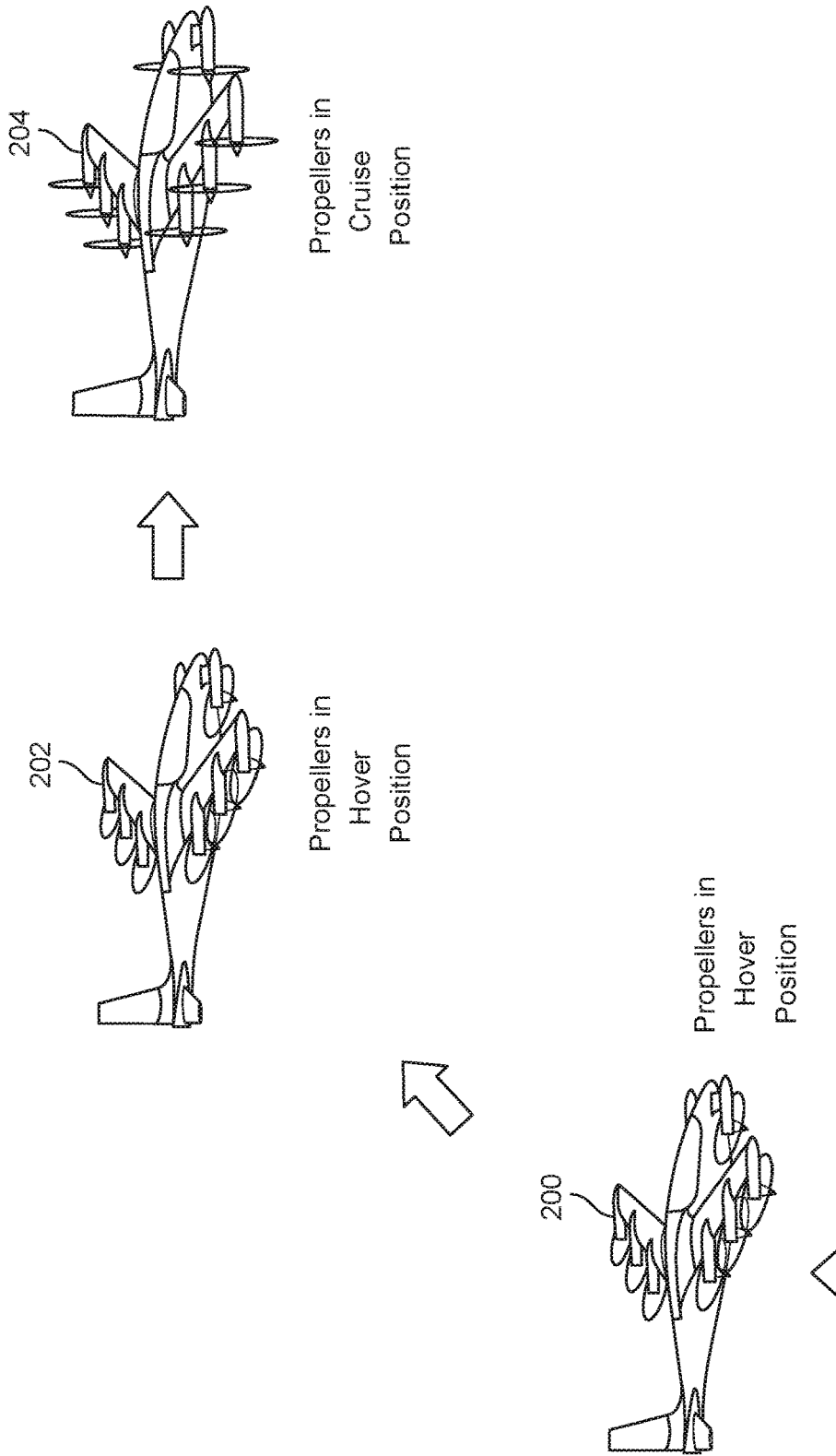

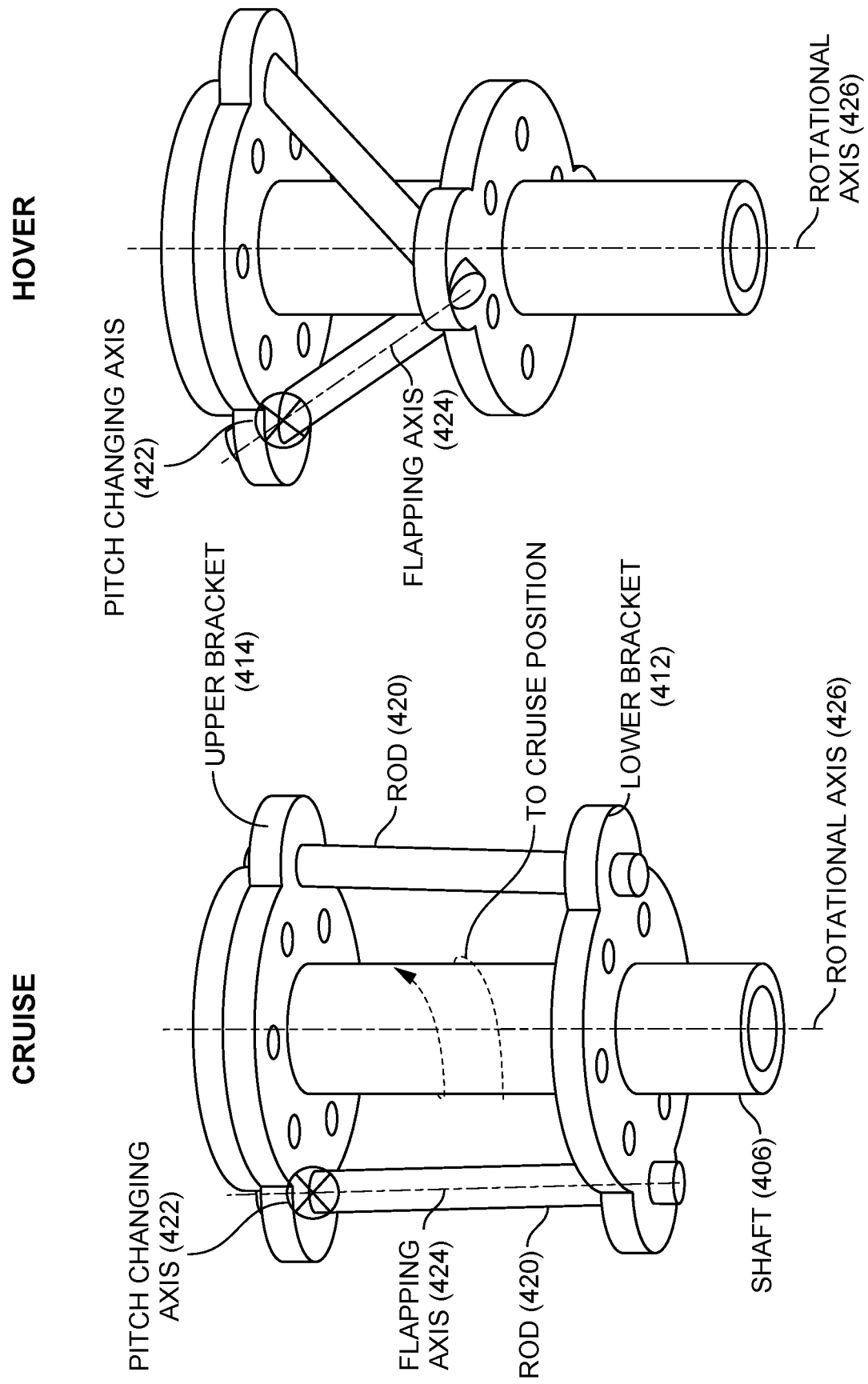

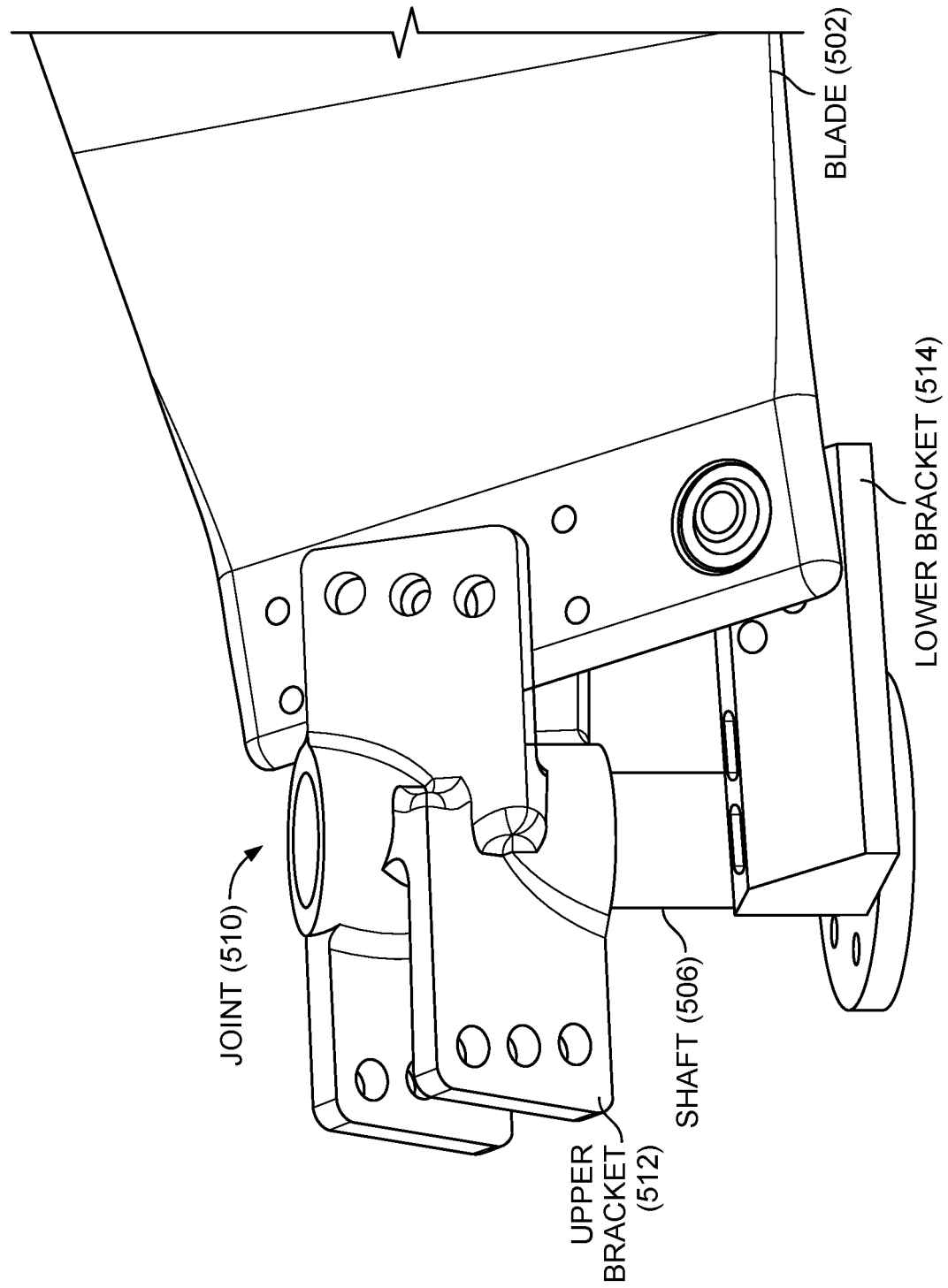

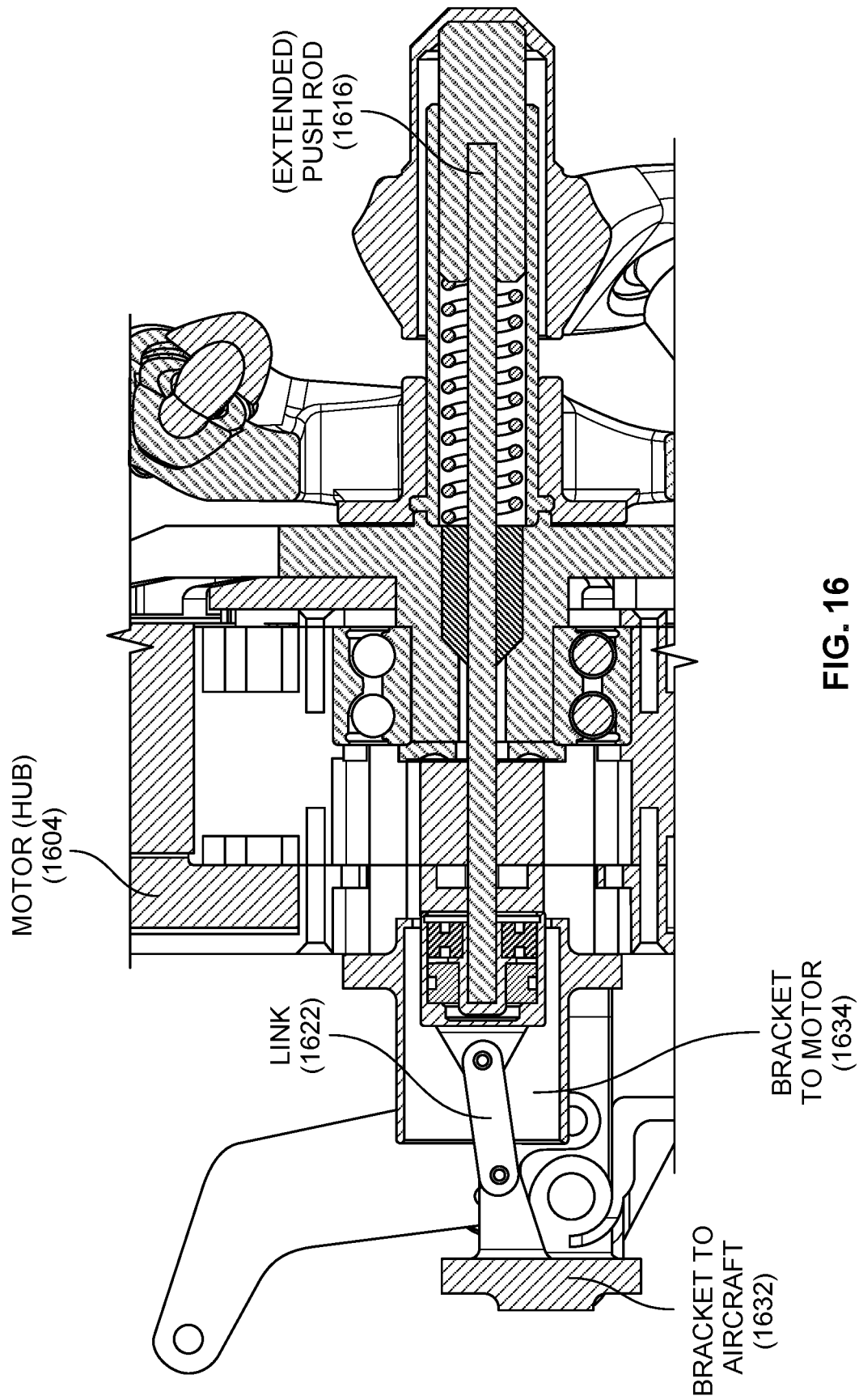

PROPELLER WITH PASSIVE VARIABLE PITCH AND ROTATABLE BASE

BACKGROUND OF THE INVENTION

Rotors or propellers (e.g., those used by helicopters) typically are at a single, relatively shallow angle of attack to provide good lift. Propellers (e.g., wing-mounted) typically present a relatively greater angle of attack to more efficiently propel an aircraft through the air. Although systems exist for varying the pitch of a blade (e.g., so that the same propeller can switch between an angle of attack which is good for hovering and another which is good for forward flight), such systems typically use complex mechanical mechanisms that add weight and expense. It would be desirable if new systems could be developed which do not cost as much and/or weigh as much.

BRIEF DESCRIPTION OF THE DRAWINGS

Various embodiments of the invention are disclosed in the following detailed description and the accompanying drawings.

FIG. 2A is a diagram illustrating an embodiment of a takeoff tilt change from hover position to cruise position.

FIG. 4A is a side view of a joint embodiment for a passive variable pitch propeller in a hover mode.

FIG. 4B is a side view of a joint embodiment for a passive variable pitch propeller in a cruise mode.

FIG. 5 is a side view of a joint embodiment for a passive variable pitch propeller.

FIG. 16 is a side view of a passive variable pitch propeller in a cruise mode.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In conventional personal aircraft, which use typical combustion engines, the pitch change of a propeller is designed to keep the engine operating in an ideal range of rotations per minute (rpm). This is because a typical combustion engine has an ideal range of rpm where it creates the highest torque with the best fuel consumption (most efficient point). A constant speed propeller uses the pitch change to keep the engine within this range of rpm in every flight regime.

Figure 1:
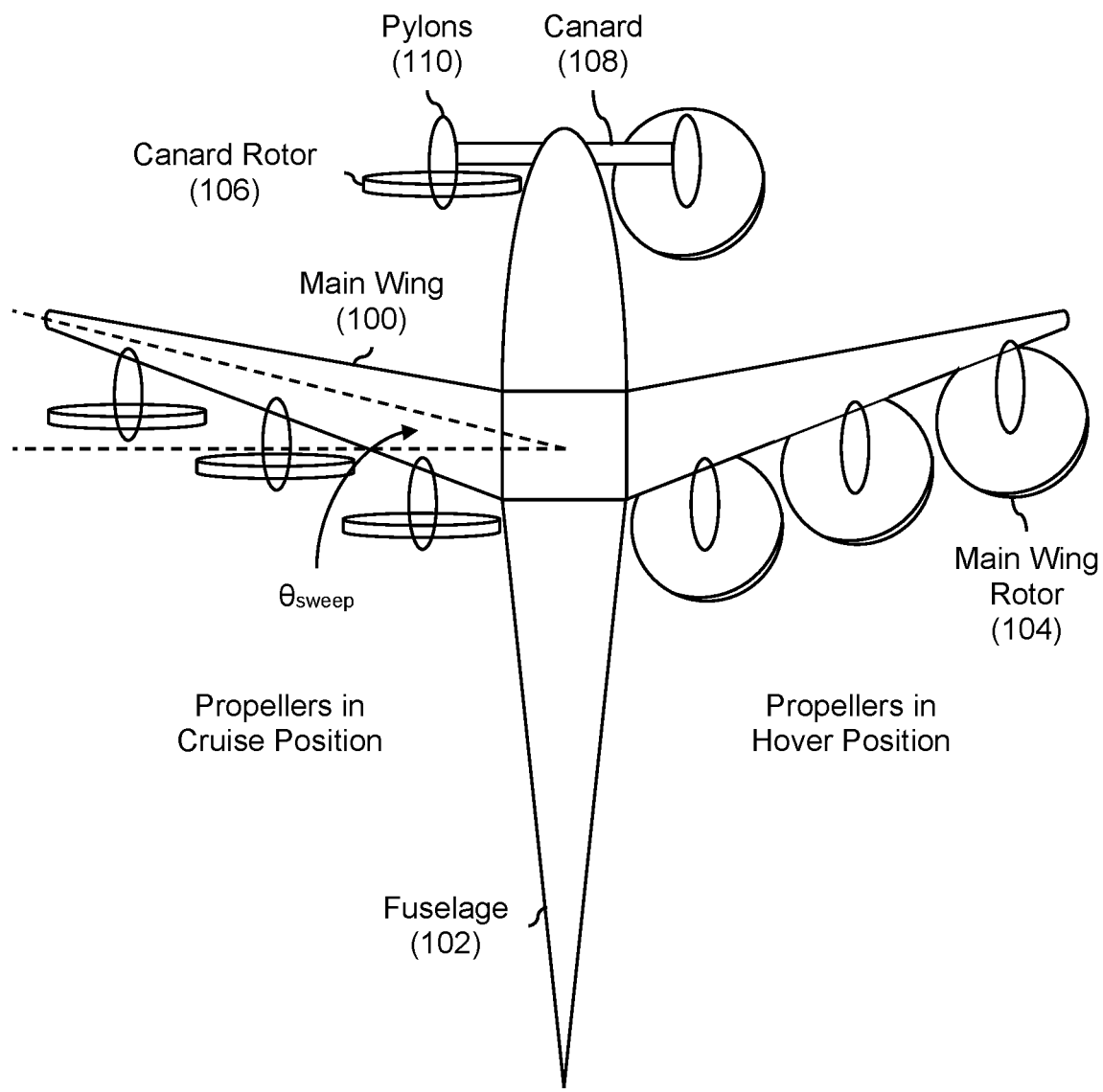
FIG. 1 is a diagram illustrating a top view of a forward swept, fixed wing multicopter embodiment with tilt propellers.

New types of personal aircraft are being developed, as more fully described with respect to FIG. 1. These new types of personal aircraft have propellers that can be optimized for both take-off and landing (e.g., vertical flight) and forward flight. The same propellers can be tilted and or the pitch of the rotor propellers varied to be efficient for a particular flight regime. More specifically, in the examples below, a shallow blade pitch is desirable in hover mode (e.g., vertical flight) to create efficient thrust at high rpm, while a steep blade pitch is desirable in a cruise mode (e.g., forward flight). To transition between the two states, say from hover mode to cruise mode, the pitch is changed from flat to steep to enable the aircraft to fly forward quickly and efficiently.

One type of existing solution to achieve pitch change is active pitch variation, which involves an actuator or engine that varies the pitch of a propeller. Another type of existing solution to achieve pitch change is a controllable pitch propeller (sometimes called a variable pitch propeller). A constant speed propeller is a variable pitch aircraft propeller that automatically changes its blade pitch in order to maintain a chosen rotational speed. One type of constant speed propeller changes pitch by pumping and regulating the amount of oil flowing through the propeller shaft to push on a piston that drives the mechanism to change pitch. Another type of constant speed propeller changes pitch by using flyweights. When the propeller reaches a certain RPM, centrifugal force causes the flyweights to swing outwards, which drives a mechanism that twists the propeller into a steeper pitch. The examples describe above are large, heavy, and inefficient. For example, constant speed propellers are heavy because of the oil and hydraulics mechanisms and the counterweight propellers. In addition, they may be inefficient and offer only coarse control of pitch change. While constant speed propellers have been used in conventional passenger aircraft such as a Cessna 190, they are not ideal for electric aircraft because the weight and inefficiency would quickly consume the on-board battery power. Conventional variable pitch propellers also do not adapt well to cylindrical hubs and encapsulating bearings.

The variable pitch propeller disclosed here uses a twisting and telescoping hinge to passively vary the pitch of propeller blades and/or has a rotatable base to tilt. In some embodiments, the propeller assembly includes a blade adapted to rotate about a longitudinal axis of the blade to vary a pitch of the blade where the blade includes a plurality of bearings provided on a proximal end of the blade. The propeller assembly also includes a joint adapted to couple the blade to a central shaft of the assembly via the plurality of bearings where the joint is adapted to telescope and twist along the central shaft of the assembly so that in a first position, the blade is at a first angle and in a second position, the blade is at a second angle greater than the first angle.

The techniques described here avoid the need for a lot of metal and are much lighter than conventional variable pitch propellers.

First, an example aircraft with tiltable propellers having passive variable pitch will be described (e.g., FIGS. 1, 2A, and 2B) to illustrate an example aircraft which may use the variable pitch propeller(s) described herein. Then, the passive variable pitch mechanism and tilting mechanism will be described.

FIG. 1 is a diagram illustrating a top view of a forward swept, fixed wing multicopter embodiment with tilt propellers. It is noted that the aircraft described in FIG. 1 is merely exemplary and the propellers described herein may be used in a variety of aircraft. Unlike conventional aircraft, which typically has fixed propellers (the propellers are at a fixed angle) that are optimized for forward flight, the aircraft here has a tiltable propeller with blades that vary in pitch passively. The same propeller can be adjusted depending on the flight mode to optimize the performance of that propeller in all flight situations. The propeller can be tilted and/or a pitch of a blade of the propeller can be varied passively and/or tilted using the techniques described below. In contrast to aircraft with conventional propellers, the aircraft here is lighter and flies more efficiently due to, among other things, more efficient pitch variation.

In the example shown, the main wing (100) is a fixed wing which is attached to the fuselage (102) in a fixed manner or position. The main wing is not, in other words, a tilt wing which is capable of rotating. The main wing (100) is also forward swept (e.g., relative to the pitch axis). For example, the forward-sweep angle may be on the order of ° sweep between 14° and 16° for aircraft embodiments with a canard (as shown here) or as high as 35° for aircraft embodiments without a canard.

In this example, the main wing (100) has six propellers (104) which are attached to the trailing edge of the main wing. For clarity, these propellers are sometimes referred to as the main wing propellers (e.g., to differentiate them from the propellers which are attached to the canard). Naturally, the number of propellers shown here is merely exemplary and is not intended to be limiting. In this example, the propeller is represented at a high level of generality. The propeller may include one or more propeller blades as further described below.

In addition to the six main wing propellers, there are two propellers (106) which are attached to the canard (108). These propellers are sometimes referred to as the canard propellers. The canard is thinner than the main wing, so unlike the main wing propellers, the canard propellers are attached to the distal ends of the canard as opposed to the trailing edge of the canard.

All of the propellers in this example are tilt propellers, meaning that they are capable of tilting or otherwise rotating between two positions. In this example, the propellers on the left-hand (i.e., port) side of the aircraft are in a cruise (e.g., forward flight, backward facing, etc.) position. See, for example, the position of canard propeller 106. In this position, the propellers are rotating about the (e.g., substantially) longitudinal axis of rotation so that they provide (substantially) forward thrust. When the propellers are in this position, the lift to keep the multicopter airborne comes from the airflow over the main wing (100) and the canard (108). In various embodiments, the rotational range of a tilt propeller may be as low as 0 degrees or as high as 90 degrees and is design and/or implementation specific.

The propellers on the right-hand (i.e., starboard) side of the aircraft are in a hover (e.g., vertical takeoff and landing, downward facing, etc.) position. See, for example, the position of main wing propeller 104. In this second position, the propellers are rotating about the (e.g., substantially) vertical axis of rotation so that they provide (substantially) upward thrust. In this configuration, the lift to keep the multicopter airborne comes from the downward airflow of the propellers.

Generally speaking, the tilt propellers, when oriented to output thrust substantially downward, permit the aircraft to perform vertical takeoff and landings (VTOL). This mode or configuration (e.g., with respect to the manner in which the aircraft as a whole is flown and/or with respect to the position of the tilt propellers specifically) is sometimes referred to as hovering. The ability to perform vertical takeoffs and landings permits the aircraft to take off and land in areas where there are no airports and/or runways. Once airborne, the tilt propellers (if desired) change position to output thrust (substantially) forwards instead of upwards. This permits the aircraft to fly in a manner that is more efficient for forward flight; this mode or configuration is sometimes referred to as cruising.

A canard is useful because it can stall first (e.g., before the main wing), creating a lot of pitching moment and not much loss of lift at stall whereas a main wing stall loses a lot of lift per change in pitching moment (e.g., causing the entire aircraft to drop or fall). Stalls are thus potentially more benign with a canard compared to without a canard. The canard stall behavior is particularly beneficial in combination with a swept forward wing, as the stall of the main wing can create an adverse pitching moment if at the wing root and can create large and dangerous rolling moments if at the wing tip. Furthermore, a canard can create lift at low airspeeds and increase $CL_{max}$ (i.e., maximum lift coefficient) and provide a strut to hold or otherwise attach the canard motors to.

In some embodiments, the pylons (110) which are used to attach the propellers to the canard and/or main wing include some hinge and/or rotating mechanism so that the tilt propellers can rotate between the two positions shown. The hinge and/or rotating mechanism is described in further detail below. Any appropriate hinge mechanism may be used. For example, with ultralight aircraft, there are very stringent weight requirements and so a lightweight solution may be desirable. Alternatively, a fixed-tilt solution may also be used to meet very stringent weight requirements.

In some embodiments, the aircraft is designed so that the main wing (100) and canard (108) are able to provide sufficient lift to perform a glider-like landing if needed during an emergency. For example, some ultralight standards or specifications require the ability to land safely if one or more propellers fail and the ability to perform a glider-like landing would satisfy that requirement. One benefit to using a fixed wing for the main wing (e.g., as opposed to a tilt wing) is that there is no danger of the wing being stuck in the wrong position (e.g., a hover position) where a glider-like landing is not possible because of the wing position which is unsuitable for a glider-like landing.

Another benefit to a fixed wing with trailing edge mounted tilt propellers is stall behavior (or lack thereof) during a transition from hover position to cruise position or vice versa. With a tilt wing, during transition, the tilt wing's angle of attack changes which makes stalling an increased risk. A fixed wing with trailing edge mounted tilt propellers does not change the wing angle of attack (e.g., even if propellers are turned off/on or the tilt propellers are shifted). Also, this configuration both adds dynamic pressure and circulation over the main wing, which substantially improves the behavior during a transition (e.g., from hover position to cruise position or vice versa). In other words, the transition can be performed faster and/or more efficiently with a fixed wing with trailing edge mounted tilt propellers compared to a tilt wing (as an example).

Another benefit associated with tilt propellers (e.g., as opposed to a tilt wing) is that a smaller mass fraction is used for the tilt actuator(s). That is, multiple actuators for multiple tilt propellers (still) comprise a smaller mass fraction than a single, heavy actuator for a tilt wing. There are also fewer points of failure with tilt propellers since there are multiple actuators (e.g., to tilt the propeller) as opposed to a single (and heavy) actuator for the tilt wing. Another benefit is that a fixed wing makes the transition (e.g., between a cruising mode or position and a hovering mode or position) more stable and/or faster compared to a tilt wing design.

In some embodiments (not shown here), the propellers are variable pitch propellers which have different blade pitches when the propellers are in the hovering position versus the cruising position. For example, different (ranges of) blade pitches may enable more efficient operation or flight when in the cruise position (see, e.g., propeller 106) versus the hovering position (see, e.g., propeller 104). To maximize efficiency, relatively steep pitches are desirable for cruise positions, and relatively shallow pitches are desirable for hover positions. When the propellers are in a cruise position (see, e.g., propeller 106), putting the blade pitches into "cruising pitch" (e.g., on the order of 23°) enables low frontal area which is good for cruising (e.g., lower drag). When the propellers are in a hovering position (see, e.g., propeller 104), putting the blade pitches into a "hovering pitch" (e.g., on the order of 2.5°) enables high disc area which is good for hovering. To put it another way, one blade pitch may be well suited for cruising mode but not for hovering mode and vice versa. The use of variable pitch propellers enables better (e.g., overall) efficiency, resulting in less power consumption and/or increased flight range. The pitch of the propellers can be varied passively as further described below.

The following figures describe exemplary tilt transitions of the propellers between cruise position and hover position.

FIG. 2A is a diagram illustrating an embodiment of a takeoff tilt change from hover position to cruise position. In some embodiments, the exemplary multicopter performs this transition soon after taking off (e.g., substantially vertically). It is noted that this tilt transition is optional and the aircraft may fly entirely with the propellers in the hovering position (albeit with less than optimal performance). For example, this could be done if there is risk in the tilting action, and it would be better to take the action at a higher altitude.

Multicopter 200 shows the exemplary aircraft after it has performed a vertical takeoff. In this state shown here, the main wing propellers and canard propellers are in hover position (e.g., rotating about a substantially vertical axis of rotation so that the propellers generate substantially upward thrust).

The multicopter then transitions from an entirely upward direction of movement to a direction of movement with at least some forward motion with the propellers remaining in the hover position until the multicopter reaches some desired altitude at which to begin the transition (202). In other words, the vehicle transitions first, and then changes the tilt of the propellers. In one example, the altitude at which the multicopter begins the propeller tilt change from hover position to cruise position is an altitude which is sufficiently high enough for there to be recovery time in case something goes wrong during the transition. Switching the propellers between hover position and cruise position is a riskier time where the likelihood of something going wrong (e.g., a propeller failing, a propeller getting stuck, etc.) is higher. Although the multicopter may have systems and/or techniques in place for recovery (e.g., compensating for a propeller being out by having the remaining propellers output more thrust, deploy a parachute, etc.), these systems and/or techniques take time (e.g., sufficient altitude) to work.

From position 202, the multicopter flies substantially forward and moves the tilt propellers from a hover position (e.g., where thrust is output substantially downward) to a cruise position. Once in the cruise position 204, the propellers rotate about the lateral axis so that they output forward thrust.

Figure 2B:
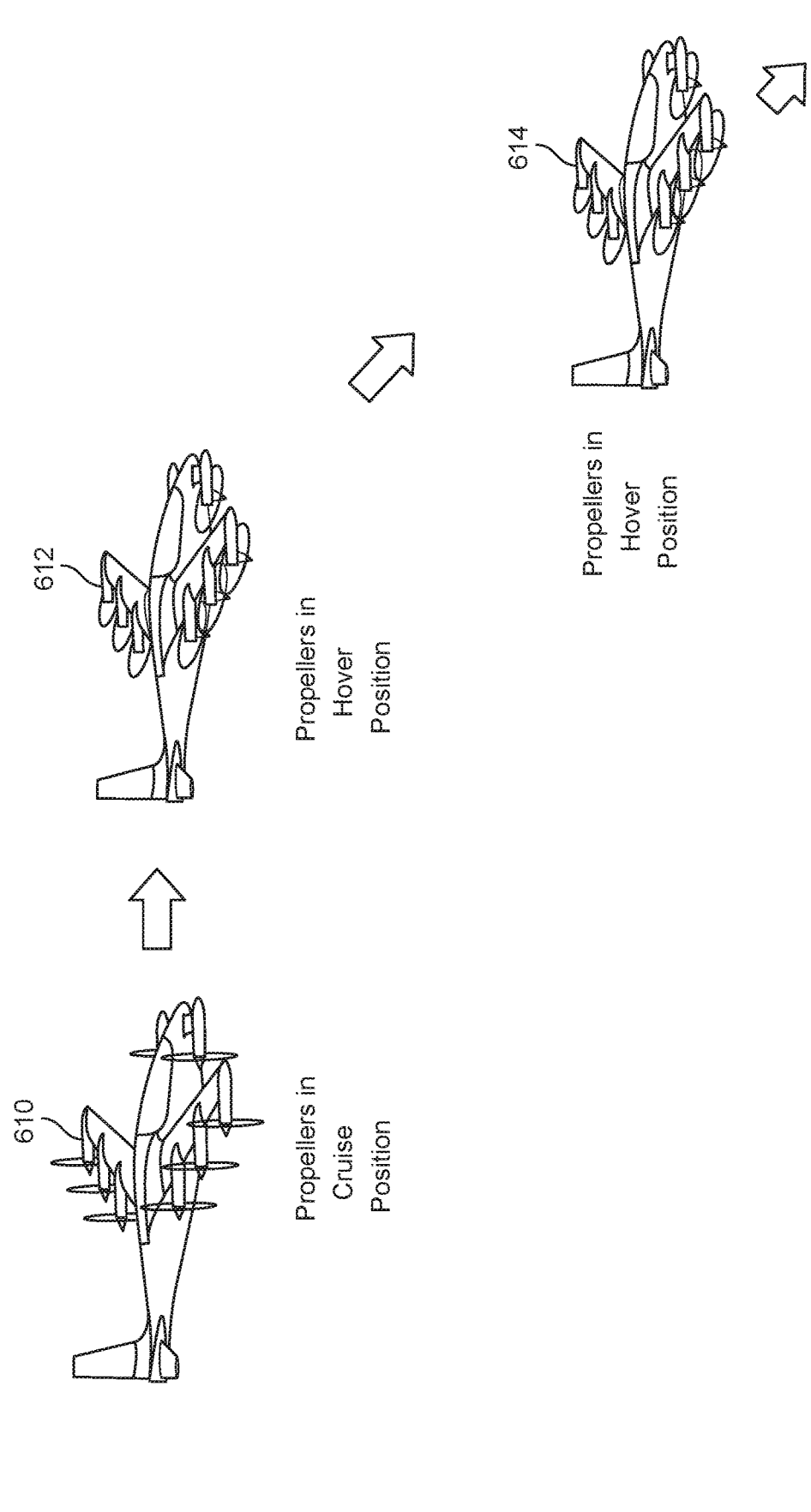
FIG. 2B is a diagram illustrating an embodiment of a landing tilt change from cruise position to hover position.

FIG. 2B is a diagram illustrating an embodiment of a landing tilt change from cruise position to hover position. For example, the exemplary multicopter may perform this transition before landing vertically. As with the previous transition, this transition is optional. For example, the exemplary multicopter can keep the tilt propellers in cruise position and perform a glider-like landing as opposed to a vertical landing if desired.

Multicopter 210 shows the propellers in a cruise position. While flying in a substantially forward direction, the tilt propellers are moved from the cruise position shown at 210 to the hover position shown at 212. With the tilt propellers in the hover position (212), the multicopter descends with some forward movement (at least in this example) so as to keep power use low(er) and retain better options in the case of a failure of a motor or other component (e.g., the multicopter can power up the propellers and pull out of the landing process or path) to position 214 until it finally lands on the ground.

In each of the flight modes shown in FIGS. 2A and 2B, the pitch of the blade may be varied passively and the propeller tilted to optimize flight efficiency and decrease power consumption. A passive variable pitch propeller increases the speed at which an aircraft is able to fly. With the mechanism described below, the balance between shaft torque, thrust, RPMs, and aerodynamic torque is able to adjust the trim angle of attack of the blades. The mechanism geometry may be adjusted until these forces yield a desired hover blade angle in hover conditions, and a much steeper cruise angle in a cruise position.

Although the examples shown above depict trailing edge mounted rotors, the passive variable pitch and tilting systems and techniques can also be applied to leading edge mounted rotors. For example, leading edge mounted rotors (on a puller blade) can use the telescoping and twisting joints described below with a modification in which the blade is flipped in the devises. The axis of rotation is selected on the side of the wing that the propeller is mounted on, as further described with respect to FIGS. 6A-6D.

For context, the following figures describe example pitch angles that are desirable for hovering and cruising, respectively. Then, embodiments of passive variable pitch propellers which achieve such desired pitch angles (e.g., in addition to switching the propellers between a downward facing position versus a backward facing position) are described.

Figure 3B:
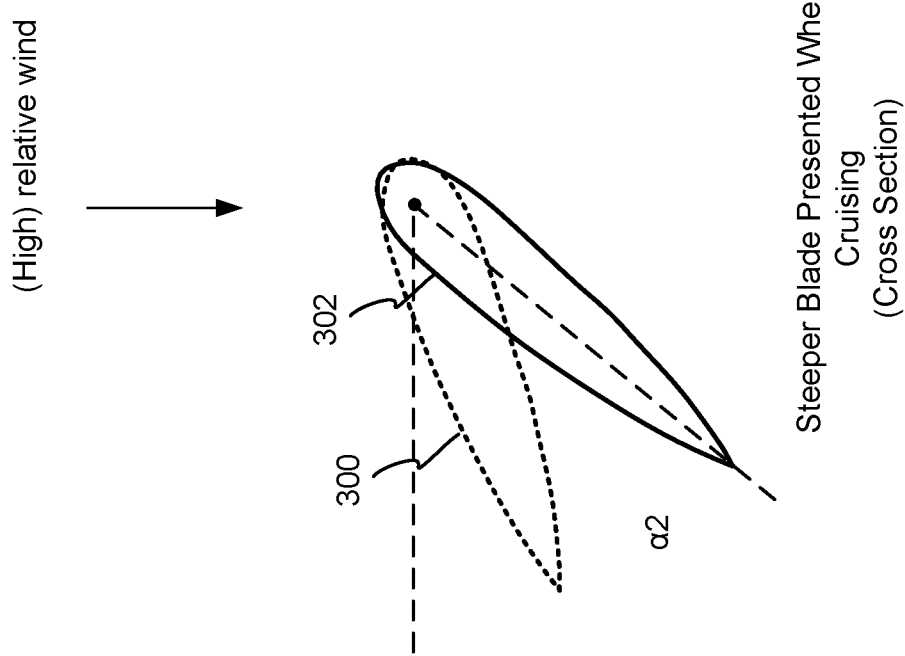
FIG. 3B illustrates an embodiment of a pitch angle associated with and/or desirable for cruising.
Figure 3A:
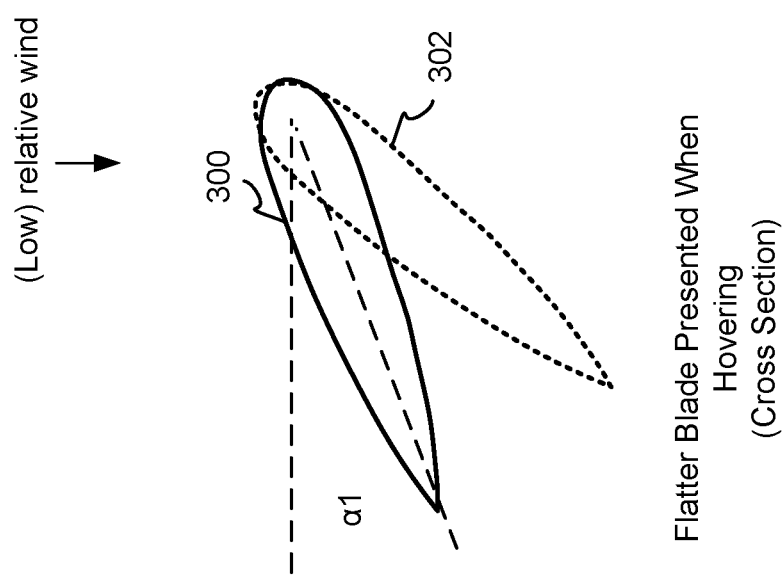
FIG. 3A illustrates an embodiment of a pitch angle associated with and/or desirable for hovering.

FIG. 3A illustrates an embodiment of a pitch angle associated with and/or desirable for hovering. In this example, blade 300 at a pitch angle that is desirable for hovering is shown. When a flatter blade is presented to a relative wind (as shown here), there is more upward thrust and therefore this type of pitch angle is good for hovering where upward thrust is desired. For example, $\alpha 1$ (the blade pitch) is relatively small. In one example, $\alpha 1=0$ degrees and the blade tip has a twist angle of 10-20 degrees. Although an aircraft may be able to hover when the blade(s) is/are at some other pitch angle (e.g., a forward flight position), the blade(s) may be put into this position when the aircraft is hovering in order to improve flight performance and/or reduce noise. For context, the blade in a cruise mode (302) is shown as a dashed outline. The following figure discusses the (steeper) cruise mode pitch angle in more detail.

FIG. 3B illustrates an embodiment of a pitch angle associated with and/or desirable for cruising. In this example, blade 302 is at a steeper pitch angle which is more suitable for forward flight. In this position, the blade pitch is $\alpha 2$ where $\alpha 2 > \alpha 1$. The blade pitch presented to the relative wind in this position is therefore steeper. The relative wind here is higher compared with the relative wind presented in FIG. 3A. For example, $\alpha 2$ may be within an angular range of 20 to 30 degrees and might therefore have a blade twist that is 30 to 50 degrees at the tip. This steeper blade pitch offers better performance for forward flight, but is not as good for hovering. Again for context, the blade in hovering mode (300) is shown as a dashed outline.

The following figures show examples of joints adapted to couple a blade to a hub (motor) to form a passive variable pitch propeller (e.g., which can achieve the desired pitch angles shown above, as well as rotate the propeller between a downward facing position and a backward facing position).

FIG. 4A is a side view of a joint embodiment for a passive variable pitch propeller in a hover mode. FIG. 4B is a side view of a joint embodiment for a passive variable pitch propeller in a cruise mode. In this example, one or more rods 420 are attached to corresponding receptacles in upper bracket 414 and lower bracket 412. The upper bracket and lower bracket towards or away from each other along shaft 406 in the helical path shown. Effectively, there is motion about rotation axis 426 and pitch changing axis 422. The motion about the pitch changing axis causes blade pitch to change. For example, the lower bracket may remain stationary, while the upper bracket moves, vice versa, or both brackets may move in unison to passively alter the pitch of a blade (not shown) joined to the joint.

FIG. 4A shows a state of the joint that is attractive for a hover mode of an aircraft (e.g., FIG. 3A), while FIG. 4B shows a state of the joint that attractive for a cruising mode of an aircraft (e.g., FIG. 3B). Blade pitch is relatively shallow in cruise mode (FIG. 4A). The joint twists and telescopes along a helical path to transition to hover mode (FIG. 4B) in which the blade pitch is relatively steep. The joint also causes the propeller to tilt downward during hovering mode (e.g., right-hand (i.e., starboard) side propellers in FIG. 1) and backward during cruise mode (e.g., left-hand (i.e., port) side propellers in FIG. 1). In this example, the rods help keep the upper and lower brackets upright. The number and placement of the rods 424 is merely exemplary and not intended to be limiting.

One effect of this configuration is a flapping axis, which is a result of the other axes. The flapping axis is an axis about which a blade moves. In this joint there is some flapping of the blade, which is represented by the flapping axis 424. Sometimes the blade will move about the flapping axis. In some embodiments, the allowance of blade flapping reduces moment loads on the hub. In other embodiments, the amount of flapping can be reduced while also reducing moment loads on the hubs. The following figure shows another example of a telescoping and twisting joint with devises to hold a blade to reduce flapping.

In some embodiments, a propeller assembly includes a blade adapted to rotate about a longitudinal axis of the blade to vary a pitch of the blade where the blade includes a plurality of bearings provided on a proximal end of the blade. The propeller assembly also includes a joint (such as the one shown in FIGS. 4A and 4B) adapted to couple the blade to a central shaft of the assembly via the plurality of bearings where the joint is adapted to telescope and twist along the central shaft of the assembly so that in a first position, the blade is at a first angle and in a second position, the blade is at a second angle greater than the first angle. In some such embodiments, using the joint shown in FIGS. 4A and 4B or the following figures, the pitch of the blade is varied passively using the telescoping and twisting of the joint along the central shaft as is shown in FIGS. 3A and 3B. In some embodiments, the joint responds to a first rotational speed of the blade to bring the blade into a first position, and the joint responds to a second rotational speed of the blade to bring the blade into a second position. FIGS. 4A and 4B shows an example where the joint includes an upper bracket adapted to mount to the central shaft.

FIG. 5 is a side view of a joint embodiment for a passive variable pitch propeller. The joint shown here can replace the one described with respect to FIG. 4A to passively vary pitch in a similar manner because the joint also telescopes and twists like the example joint described above. Here, joint 510 is coupled to blade 502 at two points, a lower bracket 514, and an upper bracket 512. The upper bracket here has a clevis, which is an arm that envelopes the blade on two sides. In this example, the lower bracket does not have an arm that envelopes the blade on two sides. The lower bracket and upper bracket are adapted to move towards or away from each other in a telescoping and twisting motion along shaft 506. For example, the lower bracket may remain stationary, while the upper bracket moves, vice versa, or both brackets may move in unison to passively alter the pitch of blade 502. The addition of the clevis compared to the previous example (FIGS. 4A and 4B) reduces flapping, while permitting a greater range of motion.

The following figure shows another example of a telescoping and twisting joint in which both upper and lower brackets have devises to hold a blade.

Figure 6A:
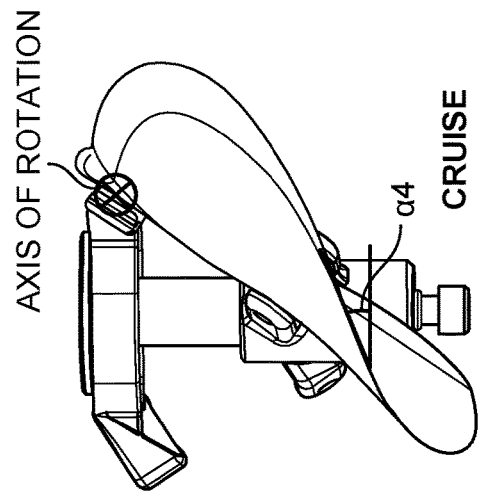
FIG. 6A is a side view of a joint embodiment for a passive variable pitch propeller with pin joints in a hover mode.

FIG. 6A is a side view of a joint embodiment for a passive variable pitch propeller with pin joints in a hover mode. The joint shown here can replace the one described with respect to FIG. 4A to passively vary pitch in a similar manner because the joint also telescopes and twists like the example joint described above. This figure shows one example where the joint includes a joint shaft, a first component including angled arm(s) adapted to receive the blade at a first point of attachment, and a second component including angled arm(s) adapted to receive the blade at a second point of attachment. In some embodiments, the first component is adapted to telescope and twist about the joint shaft. In some embodiments, the first component and the second component are each adapted to telescope and twist about the joint shaft.

Here, joint 610 is coupled to blade 602 at two points, an upper bracket 614, and a lower upper bracket 612. Each of the upper and lower brackets includes devises to hold the blade and reduce flapping of the blade. The devises allow a larger range of motion while reducing blade flapping. A clevis connects to the blade in shear, which is relatively strong. In comparison, the lower connection in FIG. 5 puts the bolt (not shown) in bending, which is relatively weaker although it may have other benefits such as being lightweight (depending on material) or less complicated to manufacture. The upper and lower brackets are adapted to move towards or away from each other in a telescoping and twisting motion along shaft 606. For example, the lower bracket may remain stationary, while the upper bracket moves, vice versa, or both brackets may move in unison to passively alter the pitch ($\alpha 3$) of blade 602. The dashed arrow shows movement of the upper bracket away from the lower bracket to transition from the hover position shown to a cruise position.

Figure 6B:
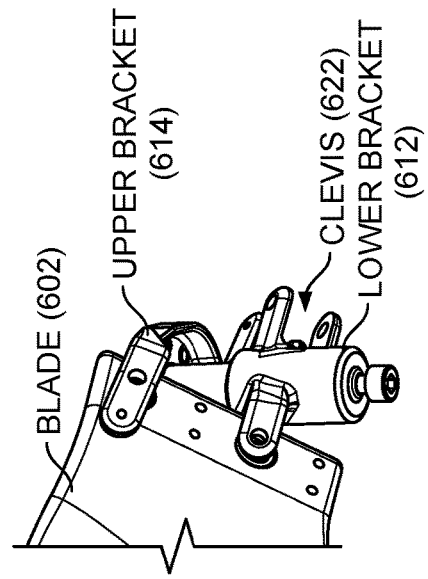
FIG. 6B is a side view of a joint embodiment for a passive variable pitch propeller with pin joints in a cruise mode.

FIG. 6B is a side view of a joint embodiment for a passive variable pitch propeller with pin joints in a cruise mode. In contrast to the hover embodiment shown in FIG. 13, the distance between the lower and upper brackets is greater. The upper bracket has also twisted to the right (from the perspective of the viewer) to increase the pitch of blade 1302. This figure shows an example of where an axis of rotation is located. For example, a swivel bearing allows the blade to move about the axis of rotation. The blade pitch in cruise position ($\alpha 4$) is relatively large compared with the blade pitch in hover position ($\alpha 3$).

Figure 6C:
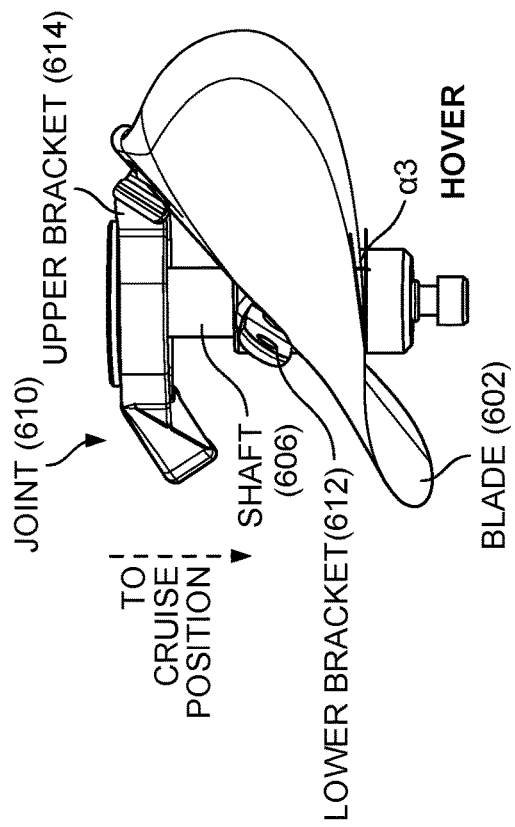
FIG. 6C is an isometric view of a joint for a passive variable pitch propeller in a cruise embodiment.
Figure 6D:
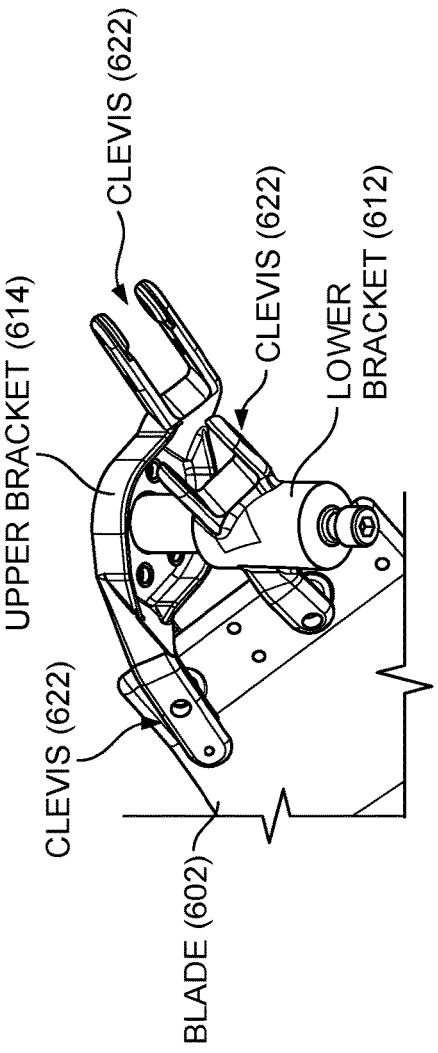
FIG. 6D is an isometric view of a joint for a passive variable pitch propeller in a cruise embodiment.

FIG. 6C is an isometric view of a joint for a passive variable pitch propeller in a cruise embodiment. The isometric view better shows the devises 622 that hold the blade in place. FIG. 6D is an isometric view of a joint for a passive variable pitch propeller in a cruise embodiment. For clarity and to expose some hidden surfaces (e.g., inside the joint), only a single blade 1602 is shown in this figure. The addition of the second clevis in FIGS. 6A-6D compared to the previous examples further reduces flapping, e.g., by acting as a bumper for a flapping blade.

The following figure shows an example of a passive variable pitch propeller assembly with the joint described above.

Figure 7:
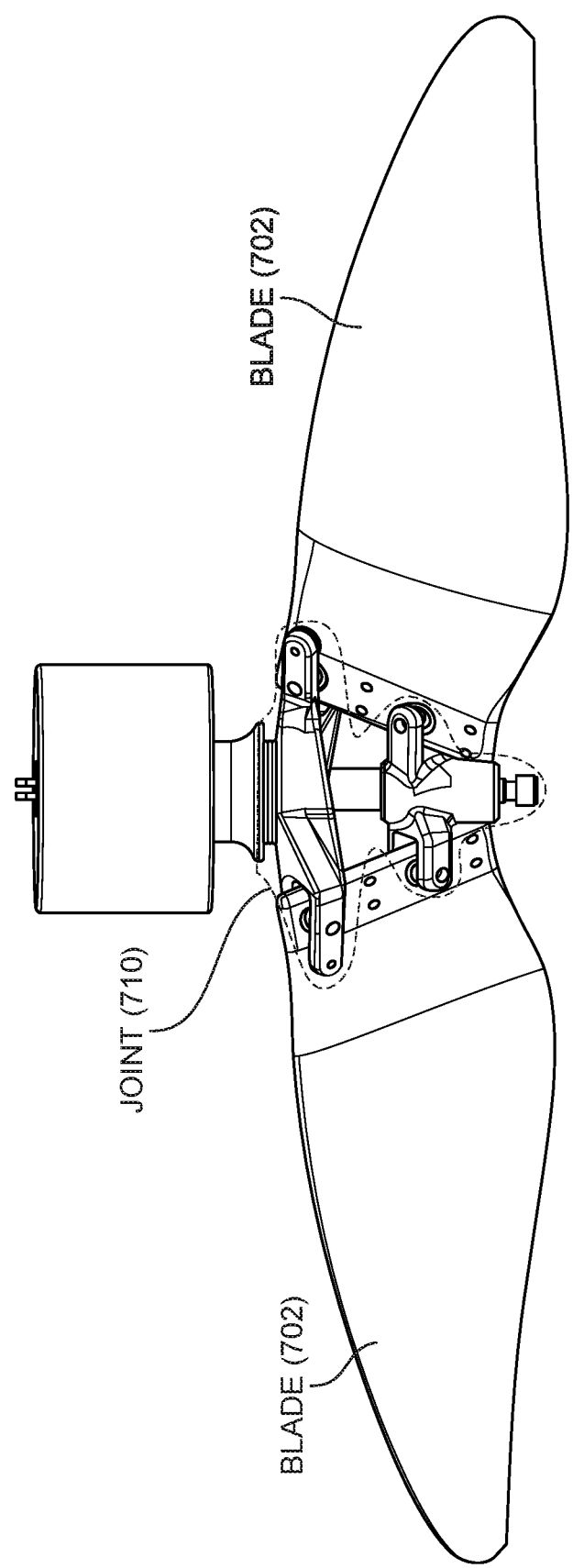
FIG. 7 is a diagram illustrating a passive variable pitch propeller with pin joints according to an embodiment.

FIG. 7 is a diagram illustrating a passive variable pitch propeller with pin joints according to an embodiment. The example shown here corresponds to the ones shown in FIGS. 6A-6C with blades installed. As shown, the joint 710 is coupled to the blade 702 at two points for each blade. The upper bracket can both extend away from (and return to) the lower bracket and twist relative to the lower bracket. Thus, this example joint is also telescoping and twisting.

The following figures show about example of a telescoping and twisting joint in the context of a blade and motor (hub) assembly.

Figure 8:
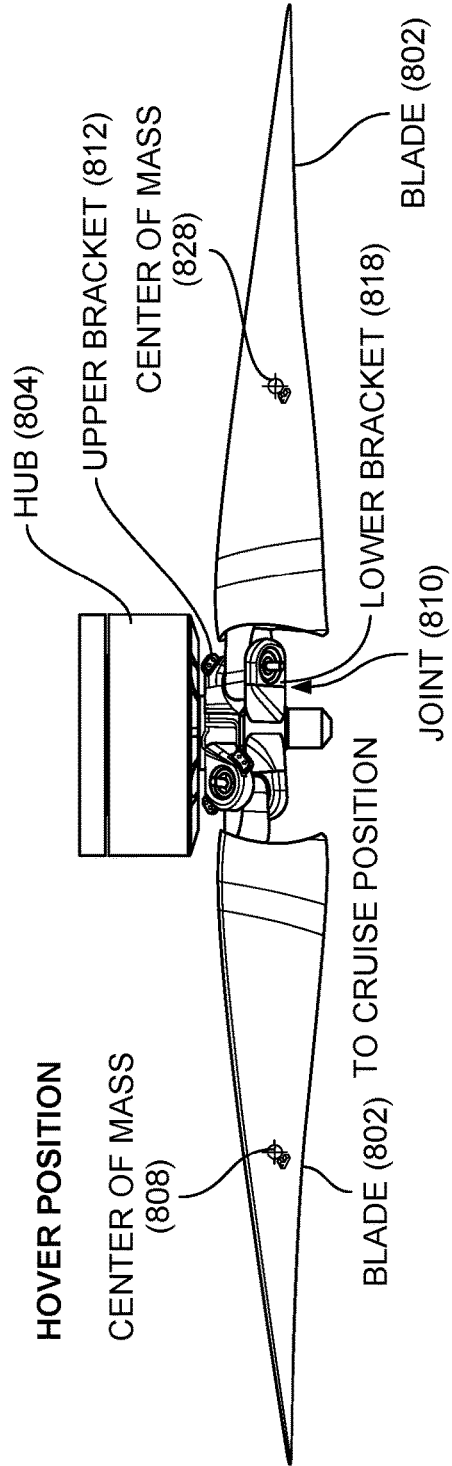
FIG. 8 is a diagram illustrating a passive variable pitch propeller in a hover mode.

FIG. 8 is a diagram illustrating a passive variable pitch propeller in a hover mode. The propeller assembly includes two blades 802, a joint 810, and a hub 804. The pitch angles of the blades correspond to that described in FIG. 3A (where the twist at the end of the blade shown here is not apparent from the cross section shown in FIG. 3A). The pitch of the blade is controlled by the hinge and rotation of the propeller. In the hover mode, the pitch of the blade is relatively shallow, which is good for hovering because a flatter blade is presented to the relative wind. The blades are structured and manufactured to have a center of mass 828. In the hover mode, the blades spin quickly, and the weight of the blades (the center of mass) causes the blades to pull into alignment with the hinge.

Joint 810 is a telescoping and twisting joint that passively varies the pitch of the blades without needing any additional electronics, hydraulics, or other pitch varying mechanisms. In the hover mode pictured here, the blades are substantially in line with the joint. In this example, the joint includes an upper bracket 812 (e.g., closer to the hub) and a lower bracket 814 (e.g., further away from the hub). Each bracket has a pair of openings adapted to rotatably couple blades to the hub (804). Here, each blade has two bearings—one bearing is fitted into the opening of the upper bracket and the other bearing fitted into the opening of the lower bracket. Depending on the speed of rotation, the distance between the upper and lower brackets changes. In the hover mode shown, the distance between the upper and lower brackets is relatively small so that they stack on top of each other at an angle. The bearings coupling the brackets to the blades swivel to accommodate the stacking of the upper and lower brackets to affect a relatively shallow pitch as shown. Alternative joints are shown in the figures above.

The hub 804 includes a motor to cause the blades to rotate via a drive shaft (sometimes called a central shaft). The blades are coupled to the shaft via joint 810. The speed of rotation may be set by a flight computer based on desired flight characteristics. The speed of rotation causes the joint and blades to behave in a way that passively varies the pitch of the blade.

In operation, hub 804 drives the blades to rotate at a rate optimized for a hovering mode, for example in the range of 4300 rpms. A spring inside the shaft pushes upper and lower brackets away from each other causing the blades to be positioned as shown, that is, having a relatively shallow pitch. The alignment between a blade center of gravity and lower bracket at high rpm (e.g., hover) causes the mechanism to flatter. The spring force will return the mechanism at lower rpm (e.g., cruise). Here, the spring is compressed. At these speeds, the center of mass of the blades causes the blades to align with the hinge (e.g., along a line radiating outward from the shaft) at the given rpm range, which further reduces the pitch. In some embodiments, the decrease in pitch or range of motion can be limited by the structure of the joint as more fully described below.

A propeller transition from the hover position (shown) to a cruise position (shown in FIG. 9) is initiated by a chance in rotational speed via the hub. This change in speed permits a spring (not shown) to push the upper and lower brackets of the joint apart (i.e., a telescoping movement). This telescoping movement causes the left joint of the upper bracket to move back, the right joint of the upper bracket to move forward, the left joint of the lower bracket to move forward, and the right joint of the lower bracket to move backward (e.g., rotational movement). The following figure shows the exemplary passive variable pitch propeller in cruise position.

FIG. 8 shows an example of using swivel bearings for a blade. This figure also shows an example where the lower bracket is adapted to float from the central shaft. Each of the upper and lower brackets includes a pair of openings angled away from each other. A first bearing of the blade is coupled to a first one of the pair of openings of the upper bracket and a second bearing of the blade is coupled to a first one of the pair of openings of the lower bracket. a second blade including a corresponding plurality of bearings provided on a proximal end of the second blade, where a first bearing of the second blade is coupled to a second one of the pair of openings of the upper bracket and a second bearing of the second blade is coupled to a second one of the pair of openings of the lower bracket. In some embodiments, in a first mode of operation, the upper bracket and the lower bracket are stacked on top of each other to passively cause the blade to be pitched at the first angle, and, in a second mode of operation, the upper and lower brackets are removed from each other at a predefined distance such that the blade is passively pitched at the second angle, as shown in FIG. 8. The addition of the swivel bearings and pair of arms angled away from each other compared to the previous examples permits or otherwise enables a greater range of motion. Additional benefits include increased range of motion, compactness of brackets, structural strength, less drag (because of a blade with a small root section), and being able to seal spinners.

Figure 9:
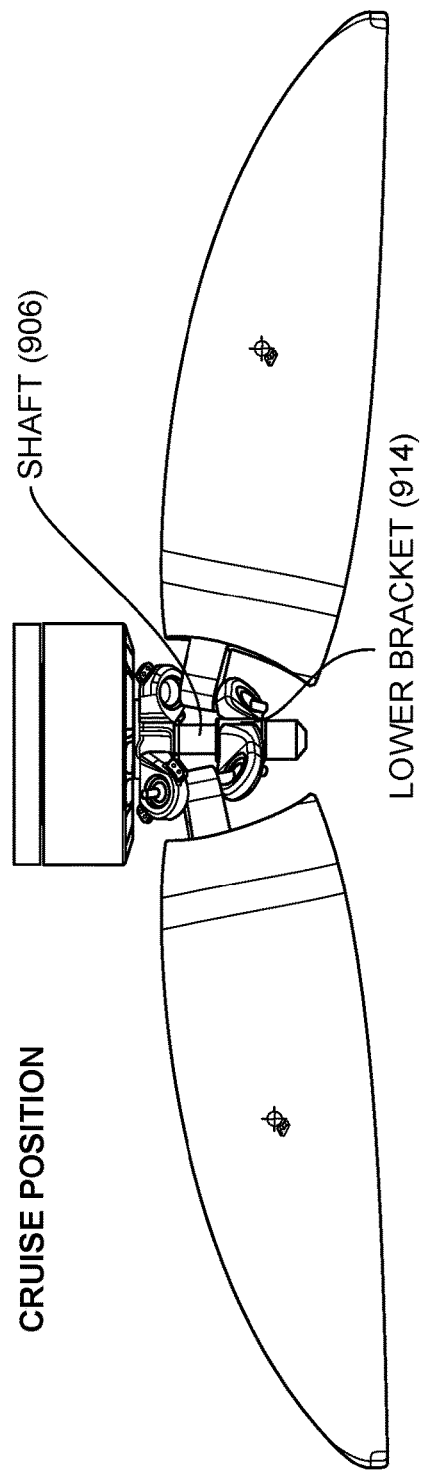
FIG. 9 is a diagram illustrating a passive variable pitch propeller in a cruise mode.

FIG. 9 is a diagram illustrating a passive variable pitch propeller in a cruise mode. The propeller assembly includes the same components as the assembly shown in FIG. 8. The pitch angles of the blades correspond to those described in FIG. 3B. This steeper blade pitch (relative to hover position) offers better performance for forward flight, but is not as good for hovering.

In hover mode, lift is generated by rapidly rotating the propellers. Once the aircraft is airborne, sufficient lift can be generated using the wings alone, and the speed of the propellers can be reduced. When the speed of rotation is reduced, a spring inside the shaft elongates, bringing the upper bracket and lower bracket apart. Note, for example, that lower bracket 914 has slid down the drive shaft. Consequently, the blades swivel to the position shown, which is a relatively steep pitch. In cruise, the blades are rotated in the range of 3000 rpms (or more if other motor(s) fail), which is slower than the rotational speed at hovering and permits the spring to be in its uncompressed state. As shown here, in some embodiments, the pitch of the blade is varied passively using the telescoping and twisting of the joint along the central shaft.

In some embodiments, a method of manufacturing the propeller assembly described here includes providing a blade adapted to rotate about a longitudinal axis of the blade, wherein the blade includes a plurality of bearings provided on a proximal end of the blade. The method also includes coupling a joint to the blade to a central shaft via the plurality of bearings, wherein the joint is adapted to telescope and twist along the central shaft of the propeller assembly such that in a first position, the blade is at a first angle and in a second position, the blade is at a second angle greater than the first angle.

Figure 10:
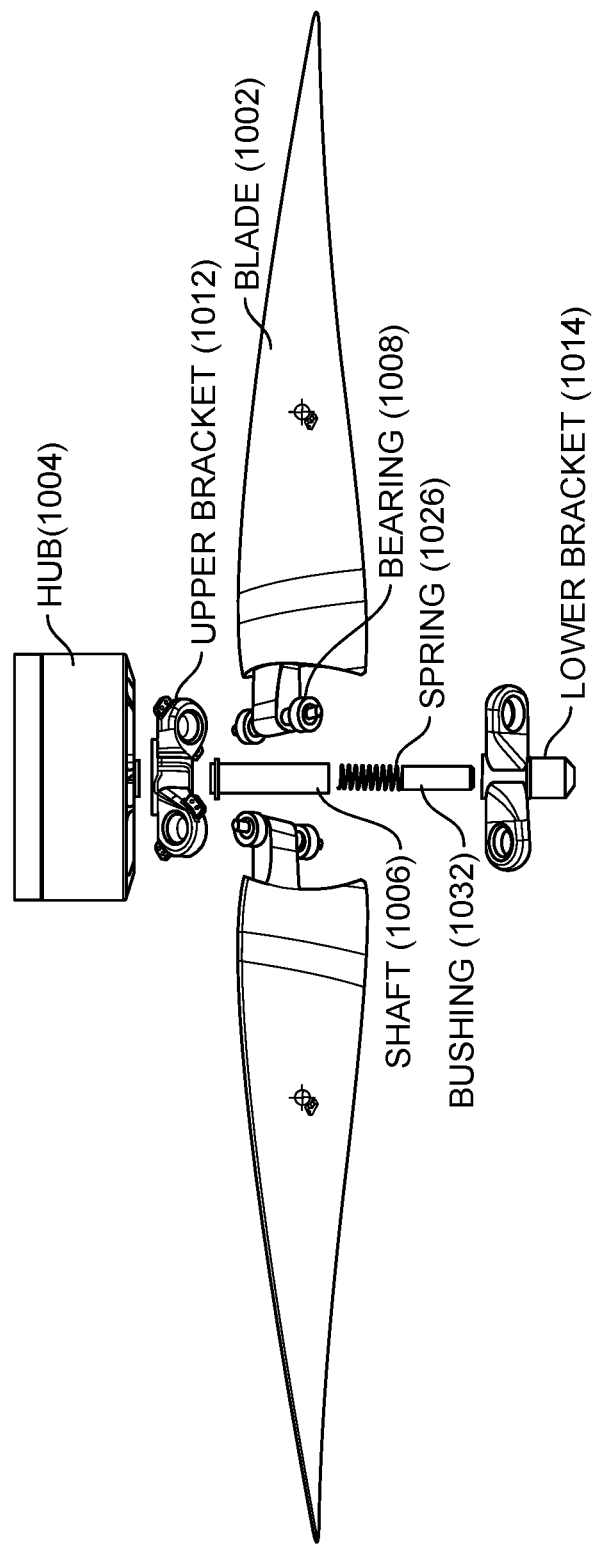
FIG. 10 is an exploded view of a passive variable pitch propeller according to an embodiment.

FIG. 10 is an exploded view of a passive variable pitch propeller according to an embodiment. The propeller assembly includes a hub 1004, two blades 1002, and a joint. The hub (which includes a motor) is joined to the blades via a shaft 1006 and the joint. The shaft transfers torque from the hub to the blades to rotate the blades about the axis running through the longitudinal axis of the hub. The rotation of the motor may also cause the blade to rotate about the blade's longitudinal axis, thus varying the pitch of the blade. The joint allows the blades to vary pitch passively.

The blade includes bearings to couple the blade to the joint. This figures shows an example where the bearings are swivel bearings. Here, four swivel bearings are pictured—two for each blade. When placed in the respective openings in the upper bracket 1012 and lower bracket 1014, the bearings allow the blades to rotate freely. The brackets move away (relatively) from each other along a helical path. Here, four swivel bearings or ball joints are used to enable the upper and lower brackets to move away from each in a helical motion. The number and placement of the bearings is merely exemplary and not intended to be limiting. Fewer or additional bearings may be used.

This figure shows an example where an upper bracket is adapted to mount to the central shaft and a lower bracket is adapted to float from the central shaft. The joint includes an upper bracket 1012 and lower bracket 1014. In some embodiments, the upper bracket is mounted to the shaft 1006, while the lower bracket is floating. A shown, each of the brackets includes a pair of openings to accommodate corresponding bearings 1008 of the blade. The openings may be angled away from each other as shown to allow the brackets to stack on top of each other in certain positions. For example, when spring 1026 is compressed, the distance between the brackets is small. The angling of the opening and the blades' ability to rotate via the bearing 1008 causes the blade to be pitched at a desired angle.

As shown in this figure, in some embodiments, the first bearing of the blade 1002 is coupled to a first one of the pair of openings of the upper bracket 1012 and a second bearing of the blade is coupled to a first one of the pair of openings of the lower bracket 1014. Also shown is a second blade including corresponding bearings provided on a proximal end of the second blade. Here, a first bearing of the second blade is coupled to a second one of the pair of openings of the upper bracket 1012 and a second bearing of the second blade is coupled to a second one of the pair of openings of the lower bracket 1014.

Also shown here, there is a spring 1026 and corresponding bushing 1032. The spring is provided inside the shaft 1006. The spring is compressed or uncompressed depending on a rotational speed of the blades. For example, when the rotational speed is relatively high, the spring is compressed (e.g., by the pressure applied by the blades), bringing the upper bracket close to the lower bracket in a telescoping and twisting motion. The blades rotate about the bearings to accommodate this positioning of the upper and lower brackets, and have a relatively shallow pitch. Conversely, when the rotational speed is relatively low, the spring can elongate, extending the upper bracket away from the lower bracket. At the same time the upper bracket is rotated away from the lower bracket. The telescoping and twisting motion causes the blade pitch to become steeper. Bushing 1032 facilitates smooth movement of the spring inside the shaft.

This figure shows one example where, in a first mode of operation, the upper bracket 1012 and the lower bracket 1014 are stacked on top of each other to passively cause the blade 1002 to be pitched at a first angle. Correspondingly, in a first spring position, the spring 1026 is compressed to cause the joint to bring the blade 1002 to the first angle. In a second mode of operation, the upper and lower brackets are removed from each other at a predefined distance such that the blade is passively pitched at a second angle. Correspondingly, in a second spring position, the spring 1026 is elongated to a second spring position to cause the joint to bring the blade 1002 to the second angle. In some embodiments, the joint responds to a first rotational speed of the blade to bring the blade into the first position, and the joint responds to a second rotational speed of the blade to bring the blade into the second position.

In some embodiments, a propeller assembly includes a spring adapted to be provided inside the central shaft as shown in FIG. 10. In a first spring position, the spring is compressed to cause the joint to bring the blade to the first angle, and the spring is elongated in a second spring position to cause the joint to bring the blade to the second angle.

Figure 11:
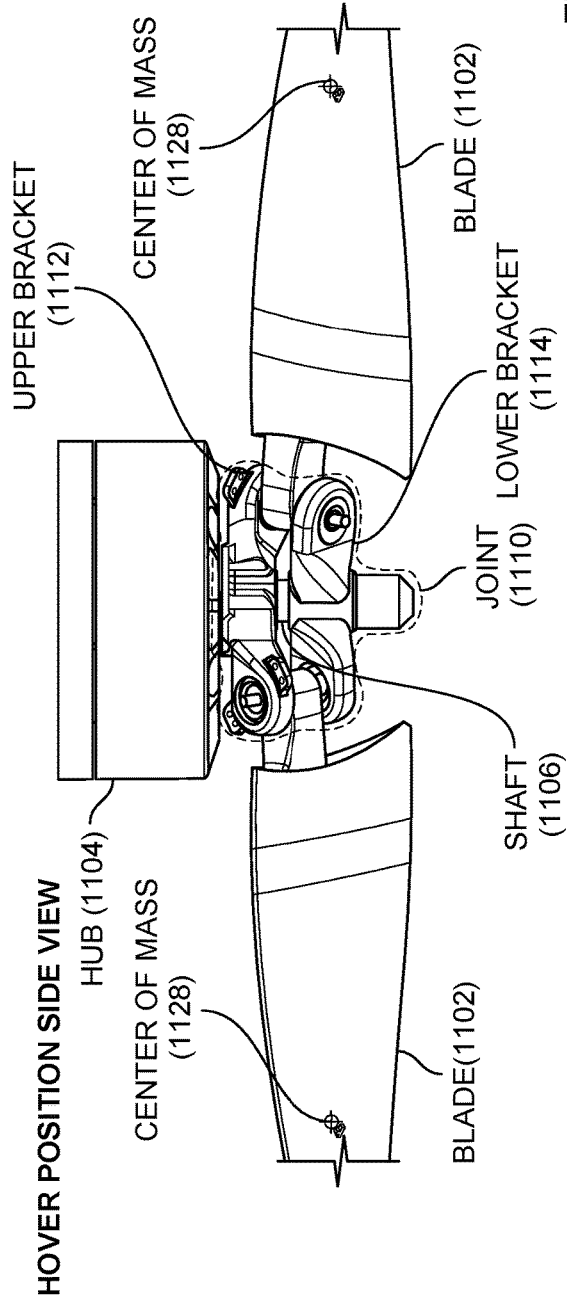
FIG. 11 is a side view of a passive variable pitch propeller in a hover mode.

FIG. 11 is a side view of a passive variable pitch propeller in a hover mode. Each of the components shown in this figure correspond to those described in FIG. 8. For example, the center of mass 1128 may be at the location shown in the blade. The joint 1110 joins the blade to the hub 1104 via shaft 1106. This figure shows an example where the joint couples the blade 1102 to a central shaft 1106 of the assembly via bearings. The joint is adapted to telescope and twist along the central shaft of the assembly. In a first position (FIGS. 7 and 8), the blade is at a first angle, and in a second position (FIGS. 9 and 10) the blade is at a second angle greater than the first angle.

This view is a close-up of the propeller shown in FIG. 8, and more clearly illustrates exemplary angling of the openings of the upper bracket 1112 and lower bracket 1114 as well as the fitting of the bearings into the openings. The upper and lower brackets are adapted to move and rotate towards and away from each other along the shaft 1106 in response to varying rotational speeds of the hub 1104, thus passively varying the pitch of the blades 1102.

Figure 12:
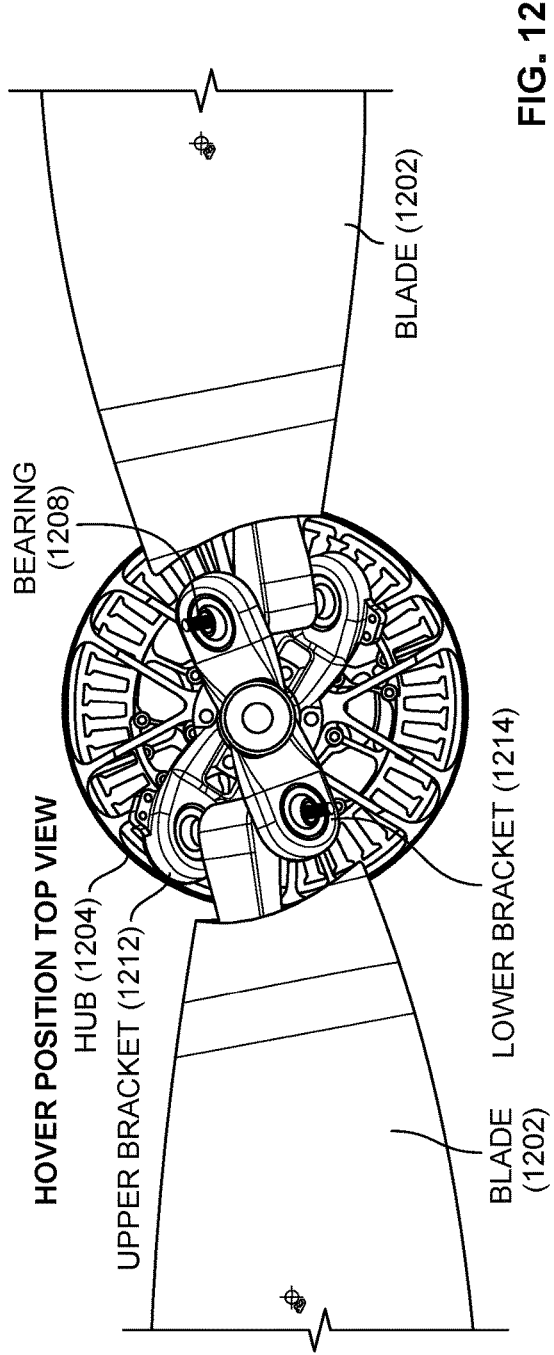
FIG. 12 is a top view of a passive variable pitch propeller in a hover mode.

FIG. 12 is a top view of a passive variable pitch propeller in a hover mode. Each of the components shown in this figure correspond to those described in FIG. 7. For example, blade 1202 is joined to hub 1204 via the joint as shown. The bearing 1208 is an example of the ones (1008) described in FIG. 10. This view illustrates the stacking of the upper bracket 1212 over the lower bracket 1214. Shown is the tabbed portion of the upper and lower brackets where the openings are substantially parallel to each other.

Figure 13:
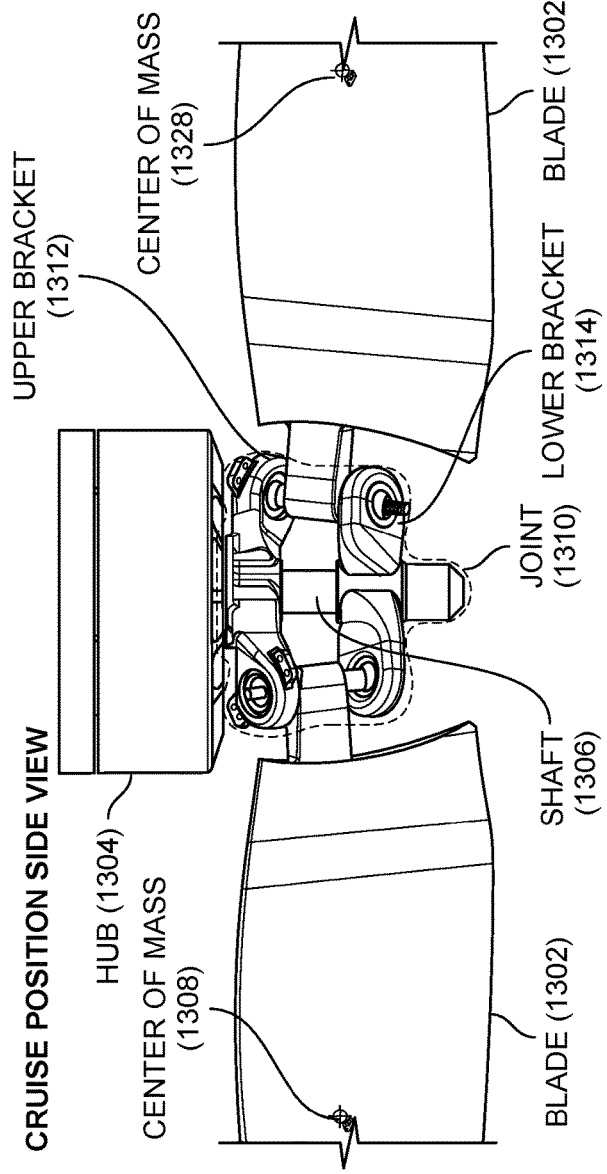
FIG. 13 is a side view of a passive variable pitch propeller in a cruise mode.

FIG. 13 is a side view of a passive variable pitch propeller in a cruise mode. Each of the components shown in this figure correspond to those described in FIGS. 8 and 9. For example, the center of mass 1328 may be at the location shown in the blade and the joint 1310 joins the blade to the hub 1304 via shaft 1306. This view is a close-up of the propeller shown in FIG. 9, and more clearly illustrates exemplary angling of the openings of the upper bracket 1312 and lower bracket 1314 as well as the fitting of the bearings into the openings. The upper and lower brackets are adapted to move and rotate towards and away from each other along the shaft 1306 in response to varying rotational speeds of the hub 1304, thus passively varying the pitch of the blades 1302. In contrast to the hover embodiment shown in FIG. 11, the distance between the upper bracket and the lower bracket is greater. When the upper and lower brackets twist and move away from each other, the blade pitch is made steeper.

Figure 14:
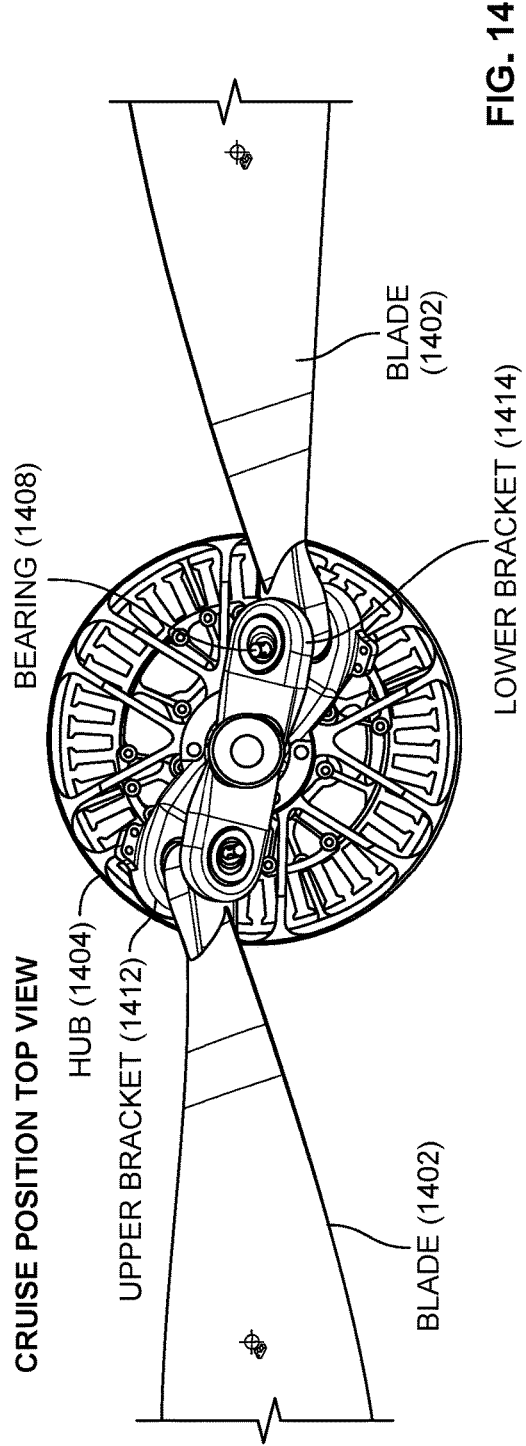
FIG. 14 is a top view of a passive variable pitch propeller in a cruise mode.

FIG. 14 is a top view of a passive variable pitch propeller in a cruise mode. Each of the components shown in this figure correspond to those described in FIG. 13. For example, the blade 1402 is joined to the hub 1404. The bearing 1408 is an example of the ones (1008) described in FIG. 10. This view illustrates the stacking of the upper bracket 1412 over the lower bracket 1414. Shown is the tabbed portion of the upper and lower brackets where the openings are substantially parallel to each other. In contrast to the hover embodiment shown in FIG. 12, the upper and lower brackets are more in line with each other. That is, the "X" formed by the upper and lower brackets is skinnier in this embodiment.

In some embodiments, a passive variable pitch propeller includes an (e.g., additional) a tilting mechanism. The tilting mechanism enables the propellers to tilt from backward facing to downward facings for example to transition from hover position 202 (downward facing) to cruise position (backward facing) 204 in FIG. 2. The following figures describe one such embodiment.

Figure 15B:
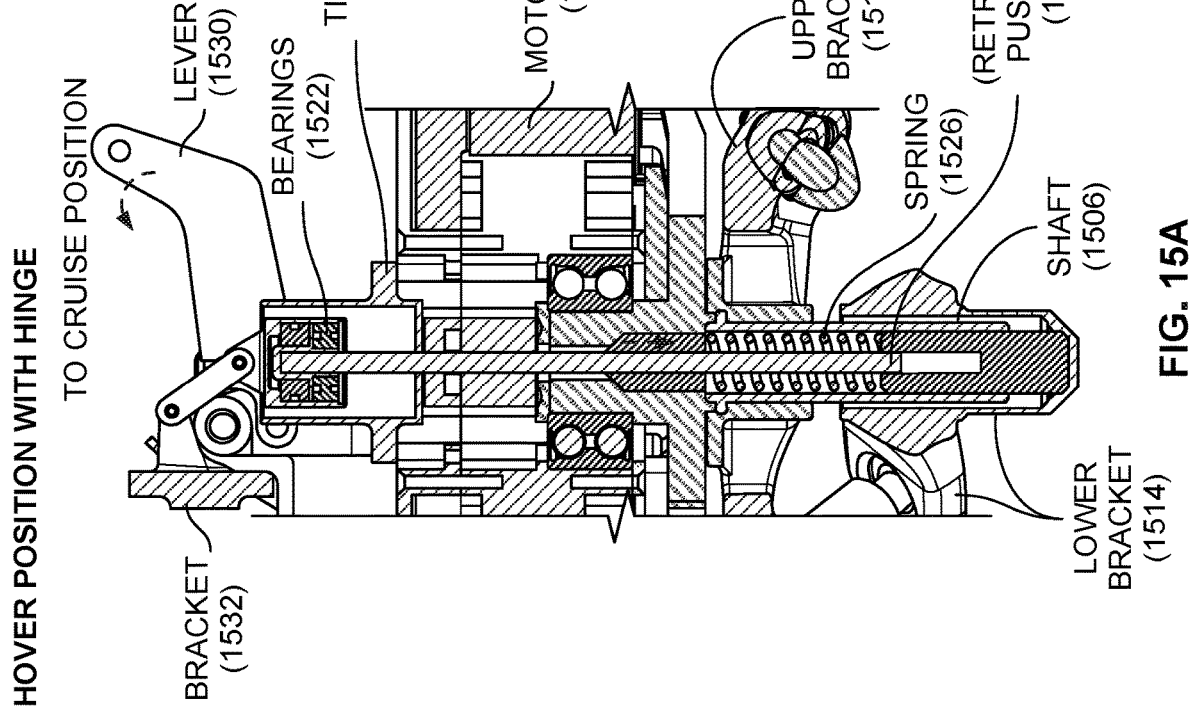
FIG. 15B is a side view of a passive variable pitch propeller in a hover mode.
Figure 15A:
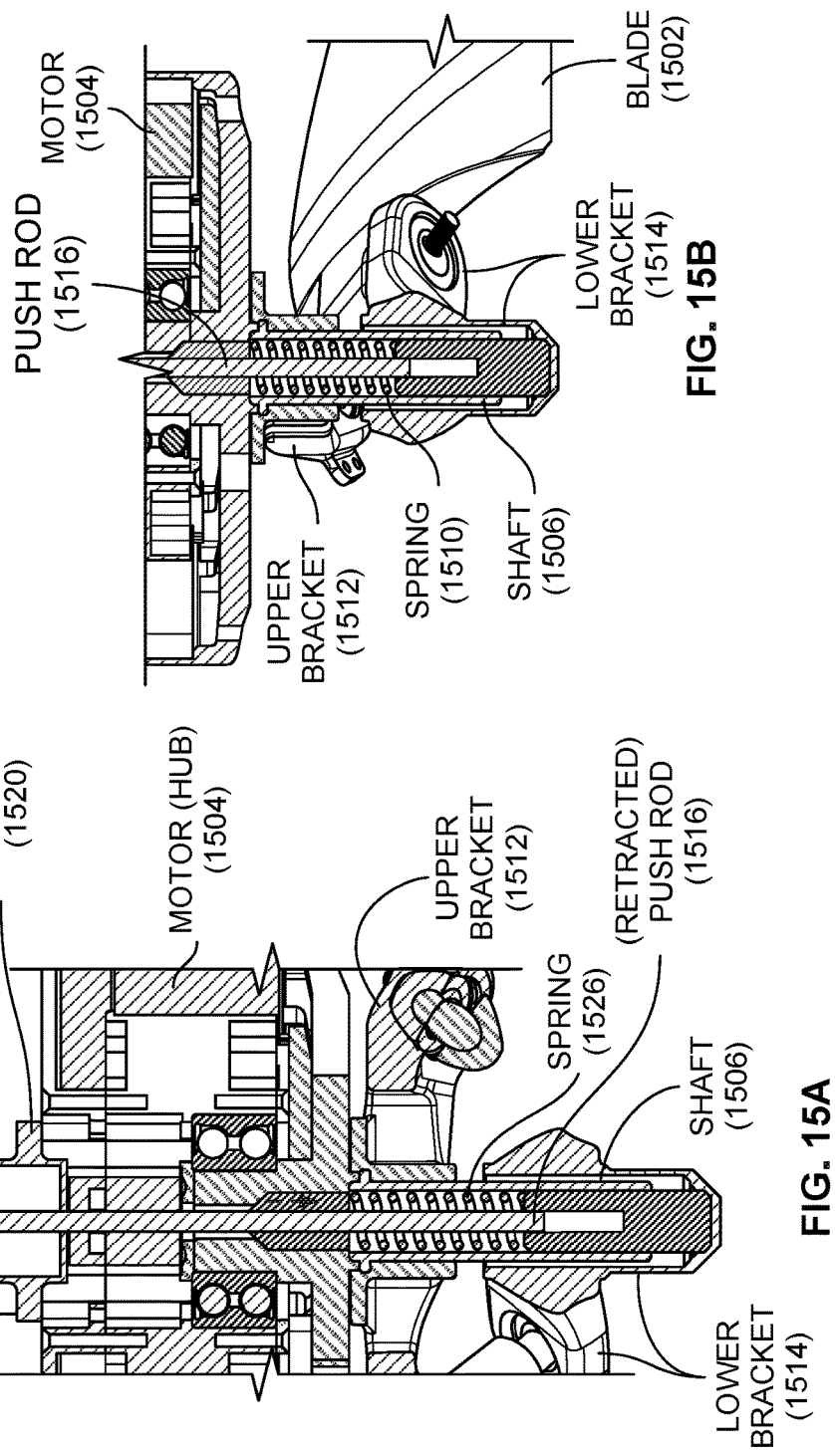
FIG. 15A is a side view of a passive variable pitch propeller with a tilting mechanism in a hover mode.

FIG. 15A is a side view of a passive variable pitch propeller with a tilting mechanism in a hover mode. The motor (sometimes called hub) 1504, upper bracket 1512, spring 1526, shaft 1506, and lower bracket 1514 are like their counterparts described above. The propeller can be tilted relative to an aircraft (for example so that the propeller can either face downward or backward as desired). This figure shows one example where the hub 1504 is adapted to tilt the propeller assembly relative to an aircraft component to which the propeller assembly is attached. For example, in FIG. 2A, the propellers can either point down per diagram 202 or tilt to face backward per diagram 204. Returning to FIG. 15A, the propeller can be tilted using tilt hinge 1520. In various embodiments, rotational speed (rpm) alone controls whether the tilt mechanism will be actuated to tilt the propeller. For example, a relatively low rotational speed corresponds to forward flight, which causes the propellers to be tilted into the orientation shown in diagram 204 of FIG. 2A. A relatively high rotational speed corresponds to vertical flight, which causes the propellers to be tilted into the orientation shown in diagram 200 of FIG. 2A.

This figure shows an example of a joint with a tilt hinge and push rod linkage. This figure also shows an example of a safety joining the hub 1504 to the central shaft 1506, where the safety includes a push rod. In a first position of the blade, the safety locks the hub into a position and the push rod prevents the blade from moving into another position.

In this example, the tilting mechanism is coupled to the passive variable pitch propeller mechanism via a push rod 1516. Push rod 1516 rotates/spins to extend and retract. Bearings 1522 arrest spinning of the push rod 1516. The coupling of the tilting mechanism to the passive variable pitch propeller mechanism via the push rod acts as a "safety," because the tilting mechanism becomes tied to the pitch varying mechanism to prevent stalling, sudden slowdowns, sudden overspeed, and the like. Stalling, sudden slowdowns, and overspeeds can be caused by blade pitch variations in certain flight regimes. They can be prevented by, for example, "locking" a blade into a range of pitches when in a first mode of operation so that the blade pitches cannot decrease/increase into a range associated with a different mode of operation. In the hover position, the push rod is retracted. As shown, there is a cavity to the right of the rod that can accommodate the push rod when it is extended further into the shaft 1506. The propeller is tilted via lever 1530. For example, the lever can be pushed in the direction of the dotted arrow to transition to a cruise position. The pushing of the lever causes the push rod to extend further into the shaft in the direction of the dotted arrow.

In some embodiments, in a first position of the blade, the safety locks the hub into a particular position (e.g., a third position), and the push rod 1516 prevents the blade from moving into another position (e.g., a second position). In this example, the first position of the blade and the third position of the hub correspond to forward flight, and the second position of the blade corresponds to vertical flight. Bracket 1532 connects to the rest of the aircraft.

FIG. 15B is a side view of a passive variable pitch propeller in a hover mode. The components are like their counterparts in FIG. 15A. This view is a close-up of the blade 1502, spring, shaft, and pushrod portion of FIG. 15A. Returning force is produced through the spring. This drawing shows an example of the hinge position and the effect of the pushrod.

FIG. 16 is a side view of a passive variable pitch propeller in a cruise mode. Each of the components are like their counterparts in FIG. 15A. Bracket 1632 connects to the rest of the aircraft. Bracket 1634 is a motor-side bracket that connects to the hub or motor 1604. In contrast to FIG. 15A, the link 1622 has extended, causing the push rod 1616 to be pushed further into the shaft. Once the push rod is pushed all the way to the end, the upper and lower brackets are prevented from coming too close to each other and fall back into a hover embodiment. In other words, when the tilt hinge is in a cruise position, the safety ensures that the blade pitch will also be appropriate (e.g., relatively steep) for cruising.

The example joint described in FIGS. 6A-6D can also be provided in an assembly in which a tilt mechanism and passive variable pitch mechanism are integrated by a safety. The following figure shows an example.

Figure 17:
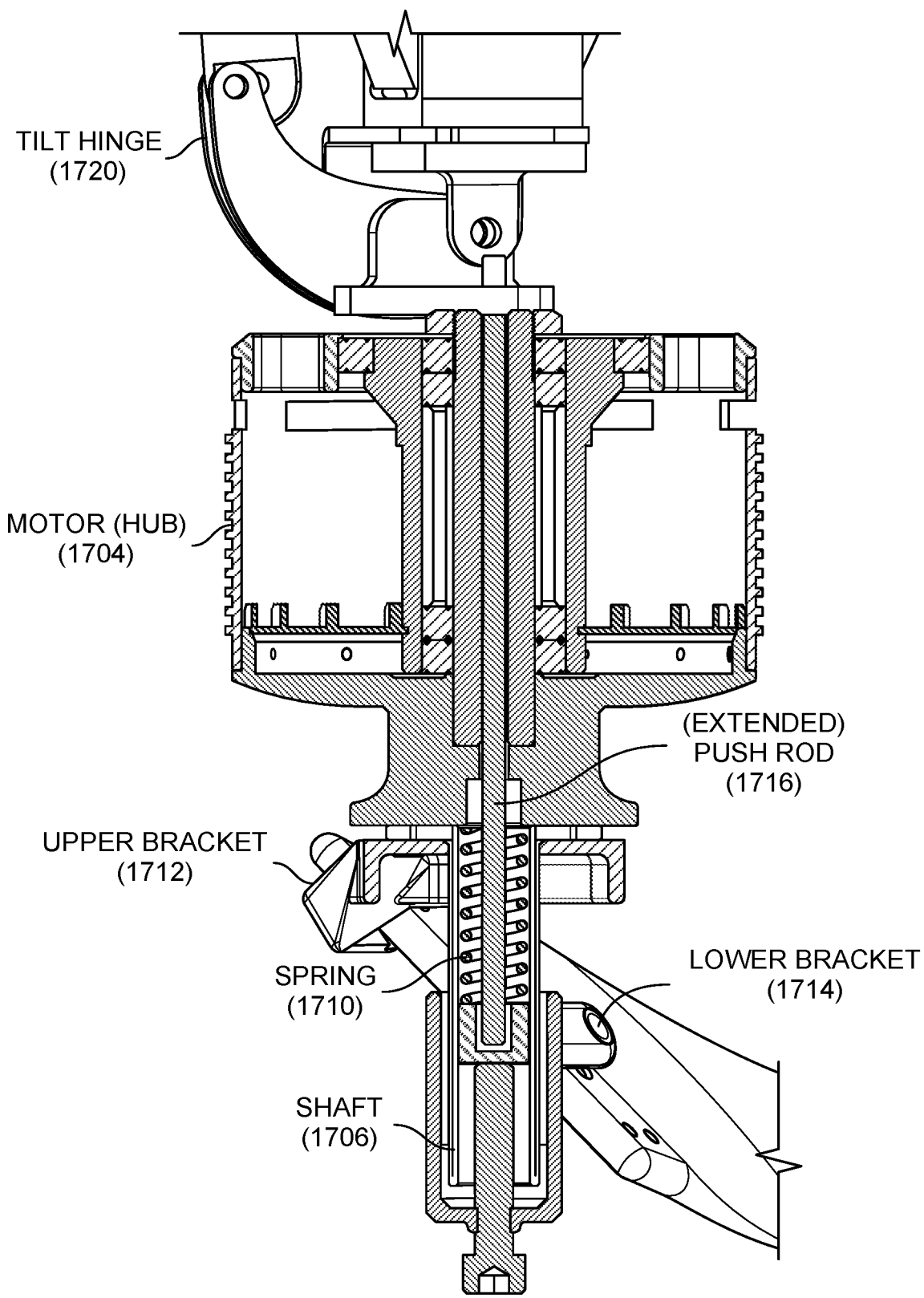
FIG. 17 is a side view of a passive variable pitch propeller in a cruise mode.

FIG. 17 is a side view of a passive variable pitch propeller in a cruise mode. Each of the components are like their counterparts in FIG. 16. For example, the hub 1704, shaft 1706, and spring 1710 are like their counterparts described above. The tilt hinge 1720 here is another example of how a propeller can be tilted relative to an aircraft. Like the example in FIG. 16, the push rod 1716 is fully extended. In this configuration, the upper bracket 1712 and lower bracket 1714 are held at a fixed distance (or relatively small range of distances) from each other to prevent the pitch of the blade to change too much, e.g., so much that the blades transition another mode of operation (e.g., hovering when it should be in cruising or vice versa).

In field tests, the passive variable pitch propeller described here yielded significant benefits. For example, more static thrust is obtained in hover mode, and more range with the same energy in cruise mode.

The passive variable pitch propeller described here also has benefits over other types of propellers. For example:
  Another prototype (e.g., than that shown in FIGS. 1-2B) uses folding propellers. Folding the propellers involves a new mode of operation on the motor controllers, increasing the complexity of flight control with an attendant increase in number of things that can go wrong and the number of things to test.
  Yet another prototype uses bistable propeller. A bistable propeller is a more complex mechanism with more discrete states in need of test. The propellers have a sudden change that the controller models and stores.
  An alternate to variable pitch propeller is a fixed pitch propeller. However, a fixed pitch propeller is loud, does not perform well in hover and/or cruise flight, and has a lower maximum speed limit.
  In contrast, a passive variable pitch propeller (some embodiments of which are described above) does not have these drawbacks.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A propeller assembly comprising:
  a blade adapted to rotate about a longitudinal axis of the blade to vary a pitch of the blade, wherein the blade includes a plurality of bearings provided on a proximal end of the blade and the plurality of bearings includes a swivel bearing; and
  a joint adapted to couple the blade to a central shaft of the assembly via the plurality of bearings, wherein the joint is adapted to telescope and twist along the central shaft of the assembly such that in a first position, the blade is at a first angle and in a second position, the blade is at a second angle greater than the first angle.

2. The assembly of claim 1, wherein the pitch of the blade is varied passively using the telescoping and twisting of the joint along the central shaft.

3. The assembly of claim 1, wherein the joint includes an upper bracket adapted to mount to the central shaft.

4. The assembly of claim 3, wherein the joint includes a lower bracket adapted to float from the central shaft.

5. The assembly of claim 4, wherein each of the upper bracket and the lower bracket includes a pair of openings angled away from each other.

6. The assembly of claim 5, wherein a first bearing of the blade is coupled to a first one of the pair of openings of the upper bracket and a second bearing of the blade is coupled to a first one of the pair of openings of the lower bracket.

7. The assembly of claim 6, further comprising a second blade including a corresponding plurality of bearings provided on a proximal end of the second blade, wherein a first bearing of the second blade is coupled to a second one of the pair of openings of the upper bracket and a second bearing of the second blade is coupled to a second one of the pair of openings of the lower bracket.

8. The assembly of claim 5, wherein in a first mode of operation, the upper bracket and the lower bracket are stacked on top of each other to passively cause the blade to be pitched at the first angle, and, in a second mode of operation, the upper and lower brackets are removed from each other at a predefined distance such that the blade is passively pitched at the second angle.

9. The assembly of claim 1, further comprising a spring adapted to be provided inside the central shaft, wherein in a first spring position, the spring is compressed to cause the joint to bring the blade to the first angle and the spring is elongated in a second spring position to cause the joint to bring the blade to the second angle.

10. The assembly of claim 1, wherein the joint responds to a first rotational speed of the blade to bring the blade into the first position, and the joint responds to a second rotational speed of the blade to bring the blade into the second position.

11. The assembly of claim 1, wherein the joint includes a tilt hinge with a push rod linkage.

12. A propeller assembly comprising:
  a blade adapted to rotate about a longitudinal axis of the blade to vary a pitch of the blade, wherein the blade includes a plurality of bearings provided on a proximal end of the blade; and
  a joint adapted to couple the blade to a central shaft of the assembly via the plurality of bearings, the joint including:
    a joint shaft;
    a first component including at least one angled arm adapted to receive the blade at a first point of attachment; and
    a second component including at least one angled arm adapted to receive the blade at a second point of attachment, wherein the first component and the second component are each adapted to telescope and twist about the joint shaft;
    wherein the joint is adapted to telescope and twist along the central shaft of the assembly such that in a first position, the blade is at a first angle and in a second position, the blade is at a second angle greater than the first angle.

13. The assembly of claim 1, wherein the joint includes:
  a joint shaft;
  a first component including at least one angled arm adapted to receive the blade at a first point of attachment, wherein the first component is adapted to telescope and twist about the joint shaft; and
  a second component including at least one angled arm adapted to receive the blade at a second point of attachment.

14. The assembly of claim 1, further comprising a hub adapted to tilt the propeller assembly relative to an aircraft component to which the propeller assembly is attached.

15. The assembly of claim 14, further comprising a safety including a push rod, the safety joining the hub to the central shaft.

16. The assembly of claim 15, wherein in the first position of the blade, the safety locks the hub into a third position, and the push rod prevents the blade from moving into the second position.

17. The assembly of claim 16, wherein the first position of the blade and the third position of the hub correspond to forward flight and the second position of the blade corresponds to vertical flight.

18. A method of manufacturing a propeller assembly, the method comprising:
  providing a blade adapted to rotate about a longitudinal axis of the blade, wherein the blade includes a plurality of bearings provided on a proximal end of the blade and the plurality of bearings includes a swivel bearing; and
  coupling a joint to the blade to a central shaft via the plurality of bearings, wherein the joint is adapted to telescope and twist along the central shaft of the propeller assembly such that in a first position, the blade is at a first angle and in a second position, the blade is at a second angle greater than the first angle.

19. An aircraft comprising:
  a propeller mounted on a wing of the aircraft, wherein the propeller is adapted to tilt to a first position during vertical flight and tilt to a second position during forward flight, the propeller including:
    a blade adapted to rotate about a longitudinal axis of the blade to vary a pitch of the blade, wherein the blade includes a plurality of bearings provided on a proximal end of the blade and the plurality of bearings includes a swivel bearing; and
    a joint adapted to couple the blade to a central shaft via the plurality of bearings, wherein the joint is adapted to telescope and twist along the central shaft such that in the first position, the blade is at a first angle and in the second position, the blade is at a second angle greater than the first angle.

20. A method of manufacturing a propeller assembly, the method comprising:
  providing a blade adapted to rotate about a longitudinal axis of the blade, wherein the blade includes a plurality of bearings provided on a proximal end of the blade; and
  providing a joint including:
    a joint shaft;
    a first component including at least one angled arm adapted to receive the blade at a first point of attachment; and
    a second component including at least one angled arm adapted to receive the blade at a second point of attachment, wherein the first component and the second component are each adapted to telescope and twist about the joint shaft; and
  coupling the joint to the blade and a central shaft via the plurality of bearings, wherein the joint is adapted to telescope and twist along the central shaft of the propeller assembly such that in a first position, the blade is at a first angle and in a second position, the blade is at a second angle greater than the first angle.

21. An aircraft comprising:
  a propeller mounted on a wing of the aircraft, wherein the propeller is adapted to tilt to a first position during vertical flight and tilt to a second position during forward flight, the propeller including:
    a blade adapted to rotate about a longitudinal axis of the blade to vary a pitch of the blade, wherein the blade includes a plurality of bearings provided on a proximal end of the blade; and
    a joint adapted to couple the blade to a central shaft via the plurality of bearings, the joint including:
      a joint shaft;
      a first component including at least one angled arm adapted to receive the blade at a first point of attachment; and
      a second component including at least one angled arm adapted to receive the blade at a second point of attachment, wherein the first component and the second component are each adapted to telescope and twist about the joint shaft;
    wherein the joint is adapted to telescope and twist along the central shaft such that in a first position, the blade is at a first angle and in a second position, the blade is at a second angle greater than the first angle.

* * * * *

UNITED STATES PATENT AND TRADEMARK OFFICE
CERTIFICATE OF CORRECTION

PATENT NO. : 10,479,482 B1  
APPLICATION NO. : 16/213636  
DATED : November 19, 2019  
INVENTOR(S) : Steffen Kuentzel and Damon Vander Lind Page 1 of 1

It is certified that error appears in the above-identified patent and that said Letters Patent is hereby corrected as shown below:

In the Specification

In Column 7, Line 21, delete "devises" and insert --clevises--, therefor.
In Column 8, Line 35, delete "devises" and insert --clevises--, therefor.
In Column 9, Line 11, delete "devises" and insert --clevises--, therefor.
In Column 9, Line 30, delete "devises" and insert --clevises--, therefor.
In Column 9, Line 31, delete "devises" and insert --clevises--, therefor.
In Column 9, Line 60, delete "devises" and insert --clevises--, therefor.

Signed and Sealed this
Twenty-sixth Day of May, 2020

Andrei Iancu
*Director of the United States Patent and Trademark Office*